United States Patent [19]

Okada et al.

[11] Patent Number: 5,659,139

[45] Date of Patent: Aug. 19, 1997

[54] METHOD OF AND APPARATUS FOR STRESS DETECTION

[75] Inventors: Seiji Okada; Toshimi Okazaki, both of Yokohama, Japan

[73] Assignee: Mazda Motor Corporation, Hiroshima, Japan

[21] Appl. No.: 605,438

[22] Filed: Feb. 22, 1996

[30] Foreign Application Priority Data

| Feb. 23, 1995 | [JP] | Japan | 7-034785 |
| Aug. 7, 1995 | [JP] | Japan | 7-200748 |
| Jan. 23, 1996 | [JP] | Japan | 8-009630 |

[51] Int. Cl.[6] .................................................. G01B 7/16
[52] U.S. Cl. .................................................. 73/778
[58] Field of Search .......................... 73/514.32, 514.33, 73/769, 778, 780, 862, 626, 724; 364/508

[56] References Cited

U.S. PATENT DOCUMENTS

| 4,062,229 | 12/1977 | Godfrey et al. | 73/778 |
| 4,813,271 | 3/1989 | Greenwood | 73/778 |
| 5,561,248 | 10/1996 | Negoro | 73/514.32 |

*Primary Examiner*—Robert Raevis
*Attorney, Agent, or Firm*—Sixbey, Friedman, Leedom & Ferguson, P.C.; Gerald J. Ferguson, Jr.; Donald R. Studebaker

[57] ABSTRACT

A stress is detected by the utilization of a semiconductor equipped with a beam oscillator which is driven to generate a compound oscillation comprising a plurality of component oscillations with different component frequencies through the steps of detecting separately component amplitudes of the compound oscillation for the respective component frequencies, standardizing power spectra of the component amplitudes with theoretically obtained reference power spectra respectively, and determining a stress generated in the beam oscillator based on a mean stress value of stress values for the standardized power spectra from relations between power spectrum and stress value previously provided for the respective component amplitudes.

20 Claims, 14 Drawing Sheets

METHOD OF AND APPARATUS FOR STRESS DETECTION

BACKGROUND OF THE INVENTION

1. Field of the invention

The invention relates to a stress detection method in which a semiconductor sensor having an oscillating member is used to detect stresses generated in the oscillating member according to amounts of dynamic forces acting on the oscillating member, such as pressure and the acceleration of gravity and a stress detection apparatus used in the stress detection method.

2. Description of Related Art

It has been proposed in dynamic quantity detection to utilize pertinently prepared semiconductor sensors. Such a dynamic quantity detecting semiconductor sensor is equipped with a stress generating member, such as a laminated film member which generates a stress according to pressure as a dynamic quantity acting thereon, or a beam member which generates a stress according to the acceleration of gravity as a dynamic quantity acting thereon. The dynamic quantity is determined by comparing the stress generated in the stress generating member with a quantitative relation between dynamic quantity and stress. The most importance in the dynamic quantity detection in which the utilization is made of the semiconductor sensor is how precise the stress detection is.

One approach to detect stresses by the semiconductor sensors is to utilize changes in resistance of a piezo electric resistor, or changes in resonant oscillation frequency of a beam.

In the case where the utilization is made of changes in resistance of such a piezo electric resistor, a laminated film of the piezo electric resistor formed as the stress generating member provides a resistance value changing according to its strain or distortions caused due to a compression stress or a tensile stress generated therein by dynamic force acting thereon, based on which the stress generated in the stress generating member is determined. In this instance, since a specific quantitative relation is established between resistance value of the piezo electric resistor film and stress generated in the stress generating member, the stress is known from the resistance value with reference to the quantitative relation.

There is, however, such a drawback in the technique that the piezo electric resistor shows a relatively significant change in resistance due to changes in ambient temperature and experiences significant changes in physical characteristics due to aging. Accordingly, the detected resistance includes a change in resistance due to distortion or strain in addition to changes in resistance due to changes in ambient temperature and aging, resulting in a significant error in stress detection.

While the change in resistance due to ambient temperature can be compensated, it is necessary to provide a compensation circuit in the stress detection apparatus and there has not been no effective approach of eliminating the changes in resistance due to aging until today.

In the case where the utilization is made of changes in resonant oscillation frequency, the stress generating member is provided in the form of a straddle mounted beam oscillator, of which a resonant oscillation frequency is detected during an oscillation caused by periodically changing external exciting force. The straddle mounted beam oscillator causes a resonant oscillation whose oscillation frequency depends upon the stress generated in the straddle mounted beam oscillator.

Letting $f_r$ and N be the resonant oscillation frequency and the stress when the straddle mounted beam oscillator causes a resonant oscillation, the following quantitative relation is established:

$$2\pi f_r = \sqrt{\alpha + \beta \cdot N}$$

where $\alpha$ and $\beta$ are positive invariables. When the resonant oscillation frequency $f_r$ is known, the stress N is determined from the above quantitative relation.

The utilization of the stress generating member in the form of a straddle mounted beam oscillator has a constraint on the extent of properly detectable stresses. Together, the detection of increased stress encounters a lack of accuracy. Specifically, since there is the quantitative relation between the resonant oscillation frequency and stress of the straddle mounted beam oscillator given by the formula (1), the condition of $N \geq -\alpha/\beta$ must be always satisfied. This indicates that the smallest detectable stress is greater than $-\alpha/\beta$ and it is impossible to detect a relatively large compression stress, consequently. Further, since a change in resonant oscillation frequency becomes smaller with an increase in stress generated in the straddle mounted beam oscillator, the resolution of stress detection is deteriorated with an increase in stress, resulting in large errors in stress detection.

While the utilization of the semiconductor sensor enables to detect dynamic quantities from stresses generated in the stress generating member, various constraints must be imposed on the semiconductor sensor. For instance, the semiconductor sensor must be enclosed in a vacuum container so as to be isolated from air resistance acting on the stress generating member during practical stress detection. The necessity of vacuum container renders the stress detecting apparatus troublesome and expensive to be manufactured and causes aggravation of yield due to dispersion in the degree of vacuum.

Even when a sufficiently high degree of vacuum is achieved in the vacuum container for the semiconductor sensor, the vacuum container experiences deterioration in vacuum leakage with progress of time. In cases where the semiconductor sensor installed in such a vacuum container is used to monitor the safety of an apparatus to which the semiconductor sensor is attached, unexpected situations occurring due to deterioration in the degree of vacuum of the vacuum container puts the semiconductor sensor unreliable and brings about a reduction in the safety of the apparatus.

Even if the problem of air resistance and deteriorated resolution in stress detection have been settled, there is still another problem that, if a band-pass filter has a distribution of transmission factors relatively widely spreaded, components with different frequencies mix in during frequency analysis. This is because, on one hand, the utilization is made of amplitude spectrum strength of various different frequencies and, on the other hand, it is hard as a design matter to provide the filter with a spread in distribution of transmission factors as small as possible.

SUMMARY OF THE INVENTION

It is an object of the invention to provide a method of and an apparatus for stress detection in which a pertinently prepared semiconductor sensor equipped with a stress generating member which generates a stress according to external dynamic force, such as pressure and the acceleration of gravity, acting thereon.

It is an object of the invention to provide a method of and an apparatus for stress detection which enables the detection of stress without an influence of changes in ambient temperature and/or an influence of changes in physical characteristics of a stress generating member due to aging, and provides a wide extent of detectable stress, but does not encounter aggravation of stress detecting resolution even when it detects increased stresses.

It is another object of the invention to provide a method of and an apparatus for stress detection in which a pertinently prepared semiconductor sensor equipped with a stress generating member is used to detect stressed without being accompanies with an influence of vacuum and/or air resistance.

It is still another object of the invention to provide a method of and an apparatus for stress detection in which a semiconductor equipped with a stress generating member is used with the effect of eliminating undesirable component frequencies.

The foregoing objects of the invention are accomplished by providing a stress detecting method in which a semiconductor sensor provided with a straddle mounted beam oscillator is used and which comprises the steps of: driving the semiconductor sensor so as to generate a compound oscillation including a plurality of component oscillations having different component frequencies, respectively; detecting separately component amplitudes of the compound oscillation for the respective component frequencies; calculating squares of the component amplitudes to provide power spectra of the component amplitudes; standardizing the power spectra, respectively, with reference power spectra which are theoretically obtained power spectra for amplitudes of oscillations having the component oscillation frequencies of the straddle mounted beam oscillator on condition that at least the straddle mounted beam oscillator is held free from any stress; determining stress values for the standardized power spectra from quantitative relations between power spectra and stress values previously provided for the component amplitudes, respectively; and obtaining a mean stress value by averaging the stress values, preferably with weighing factors determined based on the standardized power spectra, and determining a stress generated in the straddle mounted beam oscillator based on the mean stress value. The component amplitude is detected as a frequency change in electrostatic capacity generated between an electrode fixed to the straddle mounted beam oscillator and a stationary electrode fixed to the semiconductor sensor vacuum container for each component frequency, and the frequency change is squared to provide the power spectrum.

The reference power spectrum for an amplitude of an oscillation having a component oscillation frequency may be determined for the straddle mounted beam oscillator put in a vacuum. Further, the reference power spectrum for an amplitude of an oscillation having a component oscillation frequency may be determined for the straddle mounted beam oscillator assuming a state free from any stress in a vacuum.

Specifically, the different component frequencies includes at least two component oscillations having oscillation frequencies $\omega_q$ and $\omega_r$ which satisfy, respectively, the following conditions:

$$\omega_q > 44.75 \sqrt{EI/4\rho_0 AL^4}, \text{ and}$$

-continued
$$\omega_r < 44.75 \sqrt{EI/4\rho_0 AL^4}.$$

The component amplitude is detected as a frequency of change in electrostatic capacity generated between an electrode fixed to the straddle mounted beam oscillator and a stationary electrode fixed to the semiconductor sensor for the component frequency. The frequency of a change in electrostatic capacity is squared to provide the power spectrum.

The smallest component oscillation frequency among the different component oscillation frequencies of the compound oscillation is established greater than a resonant oscillation frequency of the straddle mounted beam oscillator on which a stress value representing a stress generated in the straddle mounted beam oscillator assumes an upper limit.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE EMBODIMENTS

Figure 1:
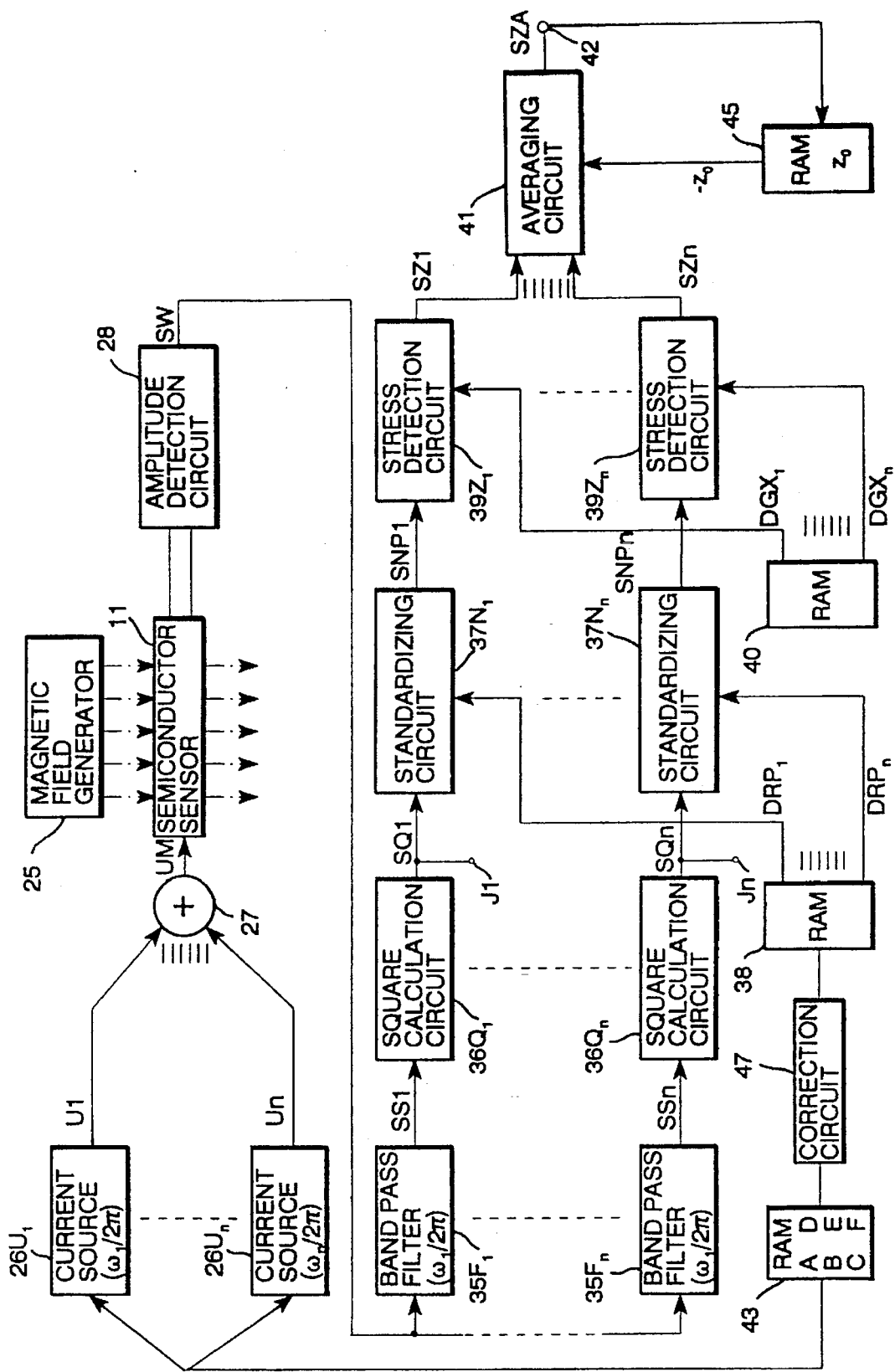
FIG. 1 is a block diagram showing a stress detecting apparatus in accordance with an embodiment of the invention.

In the analytical detection of stresses generated in a straddle mounted beam type oscillator of a semiconductor sensor by means of the stress detection apparatus of the invention, when the straddle mounted beam type oscillator is excited with exciting force of oscillation frequencies $\omega_1/2\pi, \ldots$, and $\omega_n/2\pi$ (n is a positive integer greater than 2) having amplitudes $a_1, \ldots$, and $a_n$, respectively, and, as a result, generates a compound oscillation consisting of component oscillations having oscillation frequencies $\omega_1/2\pi, \ldots$, and $\omega_n/2\pi$, respectively, the amplitude of coupling vibration W(x, t) at a time t at a distance x from one extremity of the straddle mounted beam oscillator is expressed by the following equation (2):

$$(\partial^4 W/\partial x^4) - (N/EI)\cdot(\partial^2 W/\partial x^2) + (\rho_0 A/EI)\cdot(\partial^2 W/\partial x^2) = f(t) \qquad (2)$$

where A is the sectional area of the straddle mounted beam oscillator:

$\rho_0$ is the density of the straddle mounted beam oscillator:

I is the second moment of area of the straddle mounted beam oscillator:

E is the Young's modulus:

N is the stress generated in the straddle mounted beam oscillator:

f(t) is the exciting force.

The exciting force f(t) is given by the following formula (3):

$$f(t) = a_1 e^{i\omega_1 t} + \ldots + a_n e^{i\omega_n t} \qquad (3)$$

From the geometric condition that the straddle mounted beam oscillator is fixedly held at both extremities, the following formulas (4) are satisfied:

$$w(0, t) = W(L, t) = 0, \; Wx(0, t) = Wx(L, t) = 0. \qquad (4)$$

where $Wx(0, t) = \partial W/\partial x$.

Then, carrying out Fourier transformation of the equation (2) with regard to time t, the following formula (5) is obtained:

$$(d^4 F(W)/dx^4) - (N/EI)\cdot(d^2 F(W)/dx^2) - 4\pi^2 \mu^2 \cdot (\rho_0 A/EI)\cdot F(W) = F(f) \qquad (5)$$

where $\rho$ is an oscillation frequency.

F(W) and F(f) are the Fourier transformed expressions of amplitude W(x, t) and exciting force f(t), respectively and given by the following formulas:

$$\left.\begin{array}{l} F(W) = \int_{-\infty}^{\infty} W(x,t) e^{-2\pi i \mu t} dt \\[6pt] F(f) = \int_{-\infty}^{\infty} f(t) e^{-2\pi i \mu t} dt \end{array}\right\} \qquad (6)$$

The following quantitative relation, which is obtained by solving the formula (5) under the condition of equations (4), is given by the following expression (7):

$$F(W) = [\rho\sinh(\rho L/2)\{\cos\sigma(x - L/2) - \cos(\sigma L/2)\} - \qquad (7)$$
$$\sigma\sin(\sigma L/2)\{\cosh(\rho L/2) - \cosh\rho(x - L/2)\}] \cdot F(f) +$$
$$\sigma^2 \rho^2 \{\rho\sinh(\rho L/2) \cdot \cos(\sigma L/2) + \sigma\cosh(\rho L/2) \cdot \sin(\rho L/2)\}$$

where L is the overall length of the straddle mounted beam oscillator;

$\pm\rho$ and $\pm\sigma i (i^2 = -1)$ are the roots of a characteristic equation for Y which is expressed as follows:

$$Y^4 - (N/EI)\cdot Y^2 - 4\pi^2 \mu^2 \rho_0 A/EI = 0 \qquad (8)$$

$\rho$ and $\sigma$ are given as follows:

$$\left.\begin{array}{l} \rho = \sqrt{(P + \sqrt{P^2 + 16\pi^2 \mu^2 Q})/2} \\[6pt] \sigma = \sqrt{(P + \sqrt{P^2 + 16\pi^2 \mu^2 Q}\; - P)/2} \end{array}\right\} \qquad (9)$$

where $P = N/EI$, and $Q = \rho_0 A/EI$.

The Fourier transformed expression of amplitude W(L/2, t) at the center of the straddle mounted beam oscillator is given as follows:

$$F(L/2, \mu) = [\rho\sinh(\rho L/2) \cdot \{1 - \cos(\sigma L/2)\} - \qquad (10)$$
$$\sigma\sin(\sigma L/2) \cdot \{\cosh(\rho L/2) - 1\}] \cdot F(f) +$$
$$[\sigma^2 \rho^2 \{\rho\sinh(\rho L/2) \cdot \cos(\sigma L/2) +$$
$$\sigma\cosh(\rho L/2) \cdot \sin(\rho L/2)\}]$$

This Fourier transformed expression F (L/2, μ) describes a oscillation spectrum of the straddle mounted beam oscillator at the center. A power spectrum is given as a spare of the oscillation spectrum F(L/2, μ). A Fourier transformation of the right side of the formula (5) expressing the exciting force f(t) gives the following expression (11):

$$F(f) = \sum_{k=1}^{n} \int_{-\infty}^{\infty} a_k e^{i\omega_k t} \cdot e^{-2\pi i \mu t} dt \qquad (11)$$
$$= \sum_{k=1}^{n} a_k \int_{-\infty}^{\infty} e^{-2\pi i(\mu - \omega_k/2\pi) t} dt$$
$$= \sum_{k=1}^{n} a_k \delta \cdot (\mu - \omega_k/2\pi)$$

where k is an integer variable between 1 and n, and ω/2π is the natural oscillation frequency of the straddle mounted beam oscillator.

After substituting the formula (11) for the formula (10), the quantitative relation equation of oscillation spectrum F (L/2, μ) is obtained.

Since $\partial\cdot(\mu - \omega_k/2\pi)$ has a value only for $\mu = \omega_k/2\pi$ and, however, always assumes zero (0) for μ which is not equal to $\omega_k/2\pi$, the oscillation spectrum F(L/2, μ) will separate for values of k (1, ..., n). For this reason, letting the oscillation spectrum for $\mu = \omega_k/2\pi$ be F(L/2, μ), the following formula (12) is established:

$$F_k(L/2, \mu) = [\rho\sinh(\rho L/2) \cdot \{1 - \cos(\sigma L/2)\} - \qquad (12)$$
$$\sigma\sin(\sigma L/2) \cdot \{\cosh(\rho L/2) 1\}] \cdot a_k \cdot (\mu - \omega_k/2\pi) \div$$
$$[\sigma^2 \rho^2 \{\rho\sinh(\rho L/2) \cdot \cos(\sigma L/2) +$$
$$\sigma\cosh(\rho L/2) \cdot \sin(\rho L/2)\}] \cdot a_k \delta \cdot (\mu - \omega_k/2\pi)$$

Changing the formula (12) with dimensionless values as expressed by equations (13)–(15), the formula (16) is established.

$$\rho L/2 = \upsilon, \; \sigma L/2 = \lambda \qquad (13)$$
$$PL^2 = (N/EI) \cdot L^2 = NL^2/EI = N/N_0 = z \qquad (14)$$

-continued $$16\pi^2\mu^2 QL^4 = 16\pi^2 \cdot (\omega_k/2\pi)^2 \cdot (\sigma_0 A/EI) \cdot L^4 = \omega_k^2 \cdot (4\sigma_0 AL^4/EI) \quad (15)$$

$$= (\omega_k/\omega)^2$$

$$= y_k^2$$

$$F_k(L/2, \mu) = L^4/16 \cdot [\{\upsilon_k\sinh\upsilon_k(1-\cos\lambda_k) - \lambda_k\sin\lambda_k(\cosh\upsilon_k - 1)\} \div \quad (16)$$

$$\lambda_k^2\upsilon_k^2 \cdot (\upsilon_k\sinh\upsilon_k \cdot \cos\lambda_k + \lambda\cosh\upsilon_k \cdot \upsilon_k\sin\lambda_k)] \times$$

$$a_k\delta \cdot (\mu - \omega_k/2\pi)$$

where $N_0 = EI/L2$;

$$\omega = \sqrt{EI/4\sigma_0 AL^4} \;;$$

$$\upsilon_k = \sqrt{(PL^2 + \sqrt{P^2L^2 + 16\pi^2\mu^2 QL^4})/8}$$

$$= \sqrt{(z + \sqrt{z^2 + y_k^2})/8} \;; \text{ and}$$

$$\lambda_k = \sqrt{(\sqrt{P^2L^2 + 16\pi^2\mu^2 QL^4} - PL^2)/8}$$

$$= \sqrt{(\sqrt{z^2 + y_k^2} - z)/8} \;.$$

In these formulas (14) and (15), z is a stress value, indicating and proportional to a stress N generated in the straddle mounted beam oscillator, which is established by dividing the stress N by a constant $N_0$ determined on the basis of a length L, a second moment of area I and a Young's modulus E of the straddle mounted beam oscillator, and $y_k$ ($=\omega_k/\omega$) is an angular frequency value, indicating and proportional to an angular frequency of the straddle mounted beam oscillator, which is established by dividing the angular frequency $\omega_k$ by a constant $\omega$ determined on the basis of a constant depending upon physical properties, a structural geometric condition of the straddle mounted beam oscillator.

The power spectrum $(F(L/2, \mu))^2$ is standardized by a reference power spectrum which is established when there is no stress caused in the straddle mounted beam oscillator, i.e. when N is 0, and hence $z=N/N_0$ is 0. The standardized power spectrum G(k) is given by the following formula (17):

$$G(k) = \left[ \frac{[\upsilon_k\sinh\upsilon_k(1-\cos\lambda_k) + \lambda_k\sin\lambda_k(\cosh\upsilon_k - 1)]}{[\upsilon_k\sinh\upsilon_k\cos\lambda_k + \lambda_k\sin\lambda_k\cosh\upsilon_k]} \right]^2 \quad (17)$$

$$\left[ \frac{[\sinh\sqrt{y_k/8} \; (1-\cos\sqrt{y_k/8}) - \sin\sqrt{y_k/8} \; (\cosh\sqrt{y_k/8 - 1})]}{[\sinh\sqrt{y_k/8} \cos\sqrt{y_k/8} + \sin\sqrt{y_k/8} \cosh\sqrt{y_k/8}]} \right]$$

The standardized power spectrum G(k) indicates a change rate of the power spectrum $(F(L/2, \mu))^2$ for $\mu=\omega_k/2\pi$ in connection with a stress value z. The quantitative relation between the standardized power spectrum G(k) and stress value z is shown as correlation curves for various angular frequency values ($y_k=\omega/\omega$), i.e. different component oscillations having oscillation frequencies $\omega_1/2\omega, \ldots$, and $\omega_n/2\pi$, included in a compound oscillation, in FIG. 8. Accordingly, the stress value z is obtained from the quantitative relation shown in FIG. 8 if the standardized power spectrum G(k) is known.

The state where the oscillation spectrum $F(L/2, \mu)$, which is one of factors of the denominator in the formula (16), is zero (0) as expressed by the formula (18), means that the straddle mounted beam oscillator is in a resonant state.

$$\upsilon_k \sin h\upsilon_k \cdot \cos \lambda_k + \lambda \cos h\upsilon_k \sin \lambda_k = 0 \quad (18)$$

Figure 9:
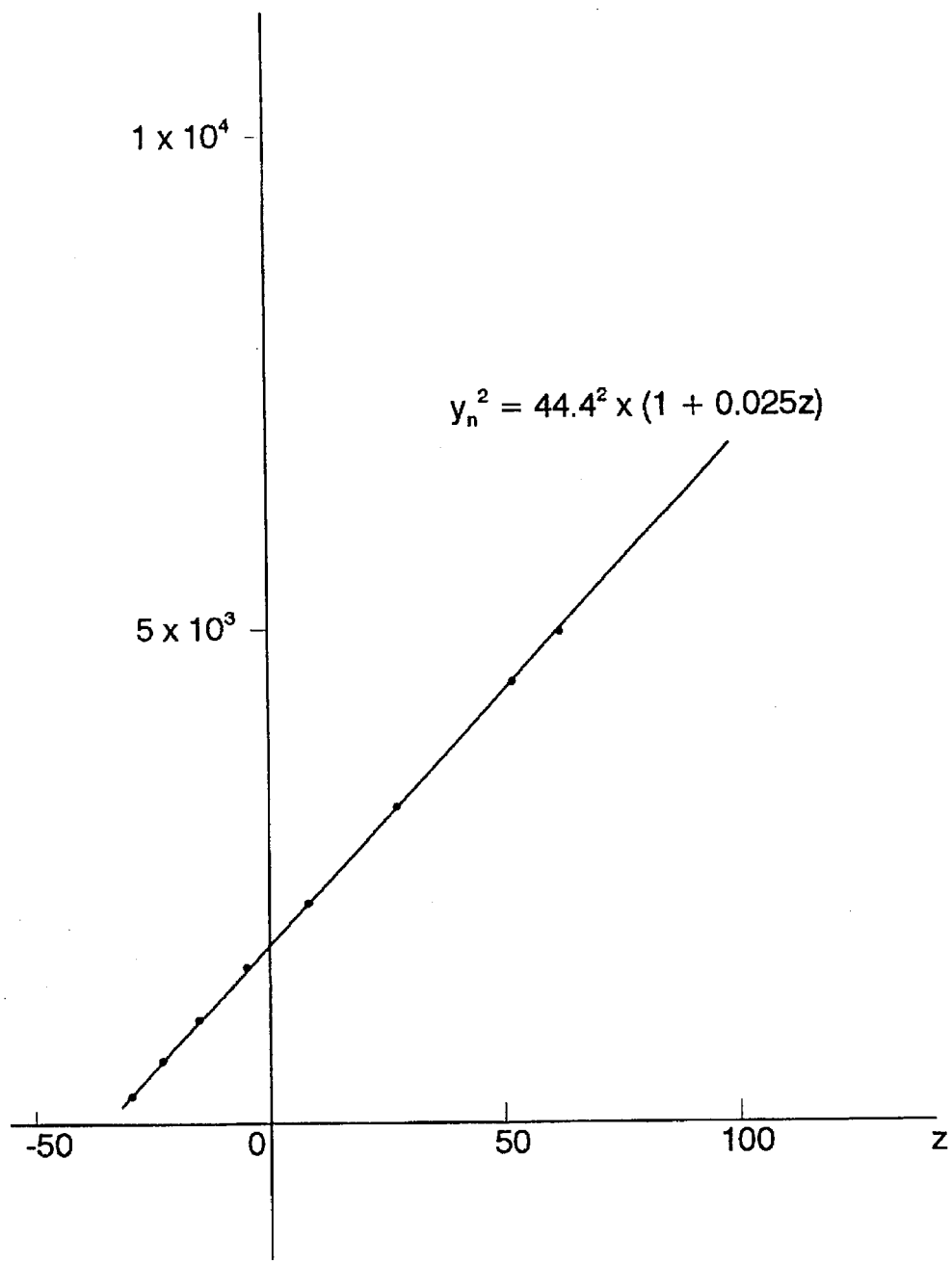
FIG. 9 is a diagram showing a quantitative relation between angular frequency and stress value when the oscillator is in a resonant state.

In the resonant state, the quantitative relation between angular frequency value ($y_k$) and stress value z is shown as correlation curves in FIG. 9 and is expressed by the following formula (19):

$$y_k = \omega_k/\omega = 44.4\sqrt{1 + 0.025z} \quad (19)$$

Figure 8:
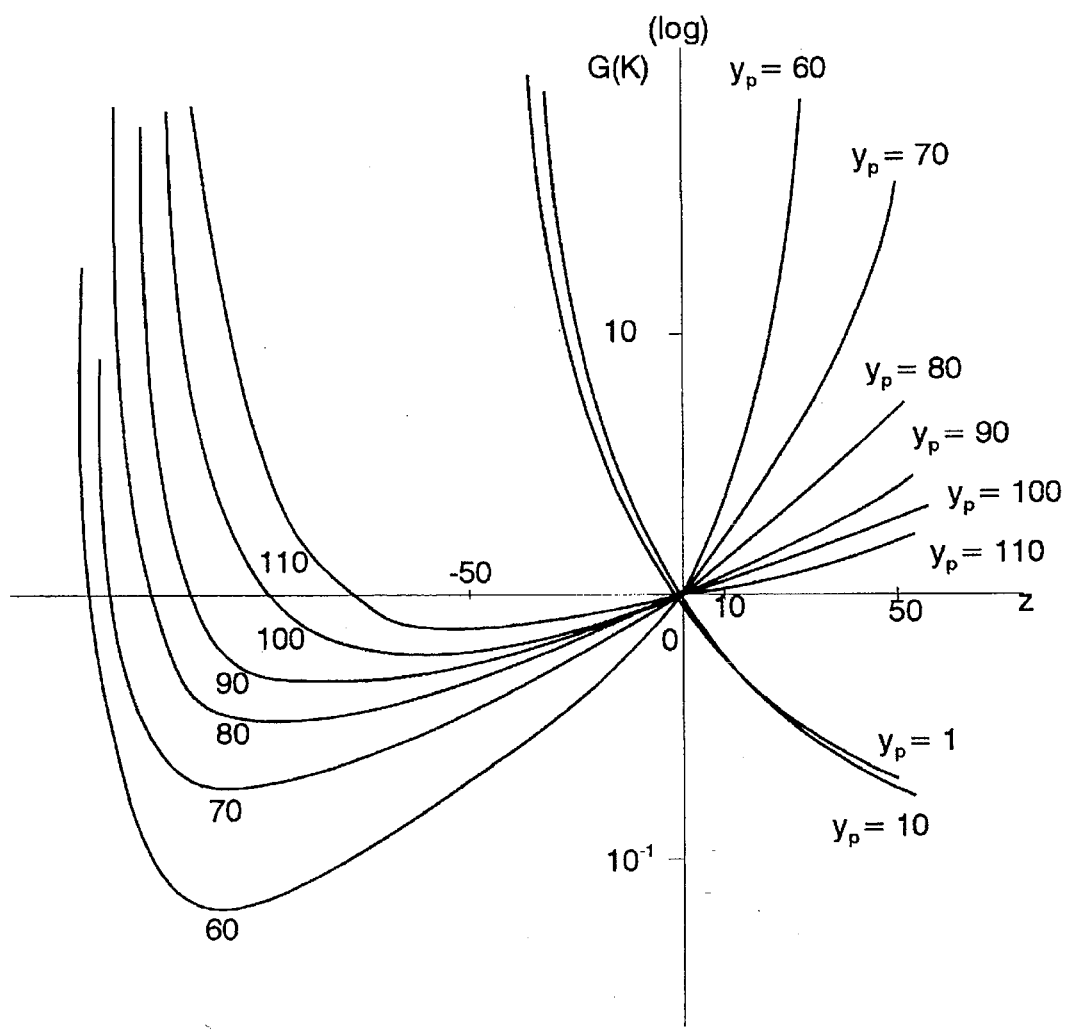
FIG. 8 is a diagram showing a quantitative relation between standardized power spectrum and stress value.

The stress value z that can be obtained from the formula (17) and FIG. 8 based on the standardized power spectrum G(k) is not appropriate but less than the stress value causing in the straddle mounted beam oscillator in a resonant state. Accordingly, letting $z_M$ and $\omega_m/2\pi$ be the upper limit of a stress value z and the smallest oscillation frequency of oscillation components included in a compound oscillation of the straddle mounted beam oscillator, the smallest oscillation frequency $\omega_m/2\pi$ must be established such that the following condition is satisfied:

$$\omega_m > 44.4\sqrt{1 + 0.025z_M} \quad (20)$$

Figure 10:
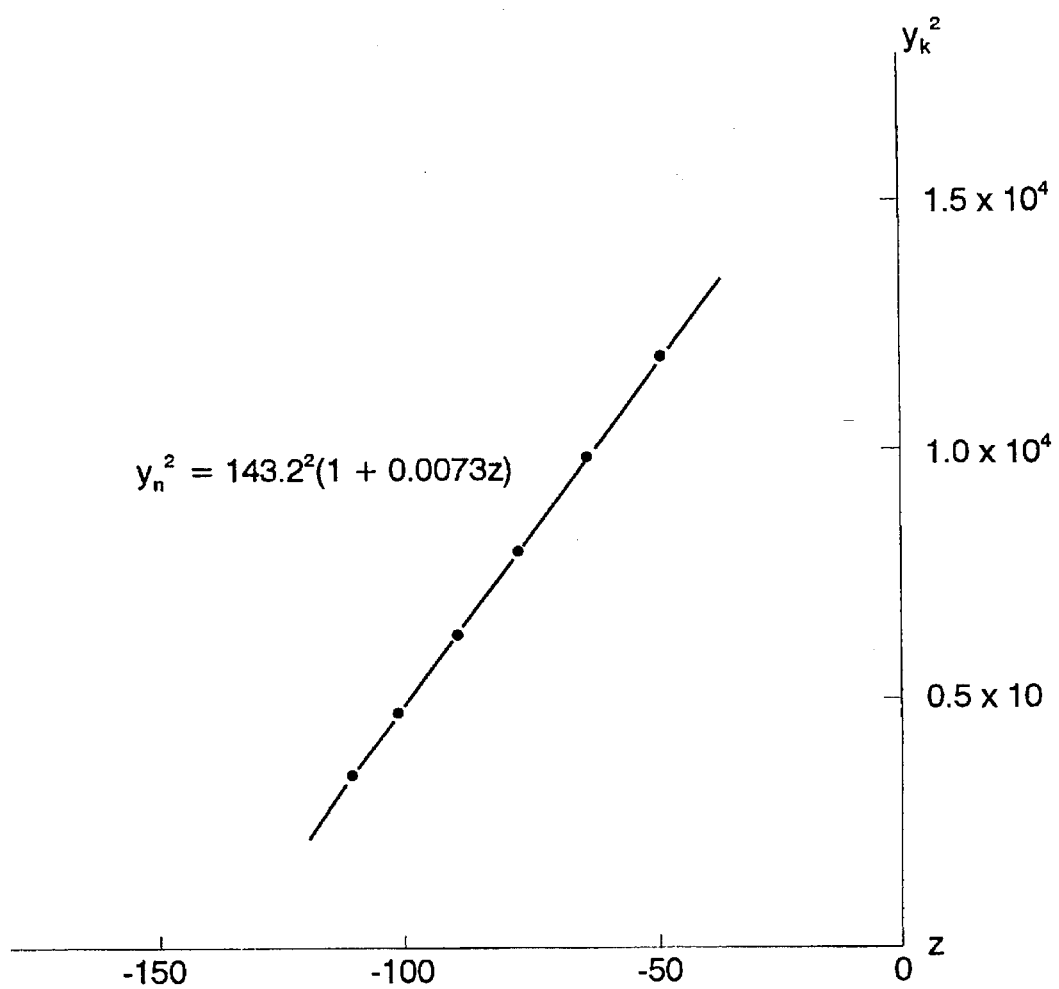
FIG. 10 is a diagram showing a quantitative relation between angular frequency and stress value when the standardized power spectrum assumes the smallest limit value.
Figure 11A:
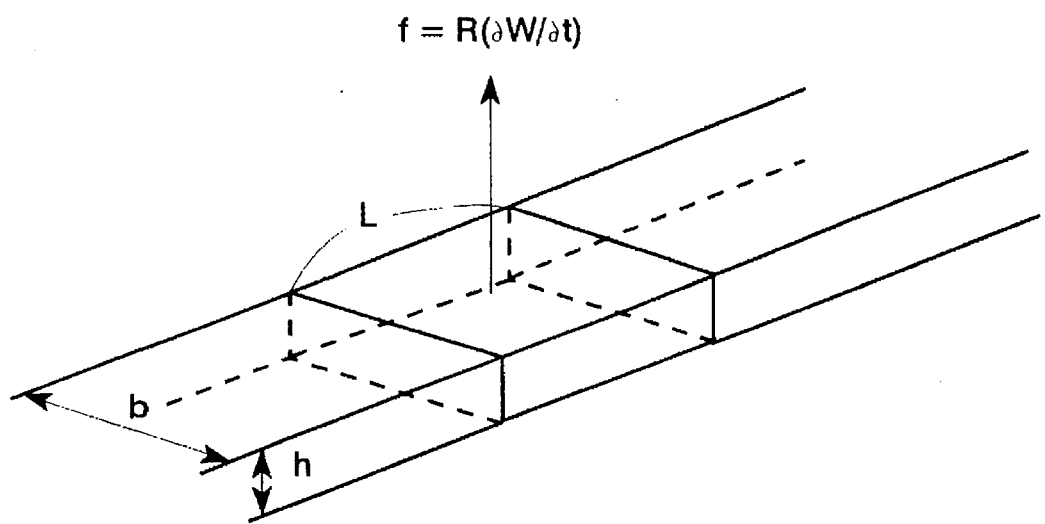
FIGS. 11(A) and 11(B) are illustrations showing an oscillator partly replaced with a with a hemisphere having a radius of b/2.
Figure 11B:
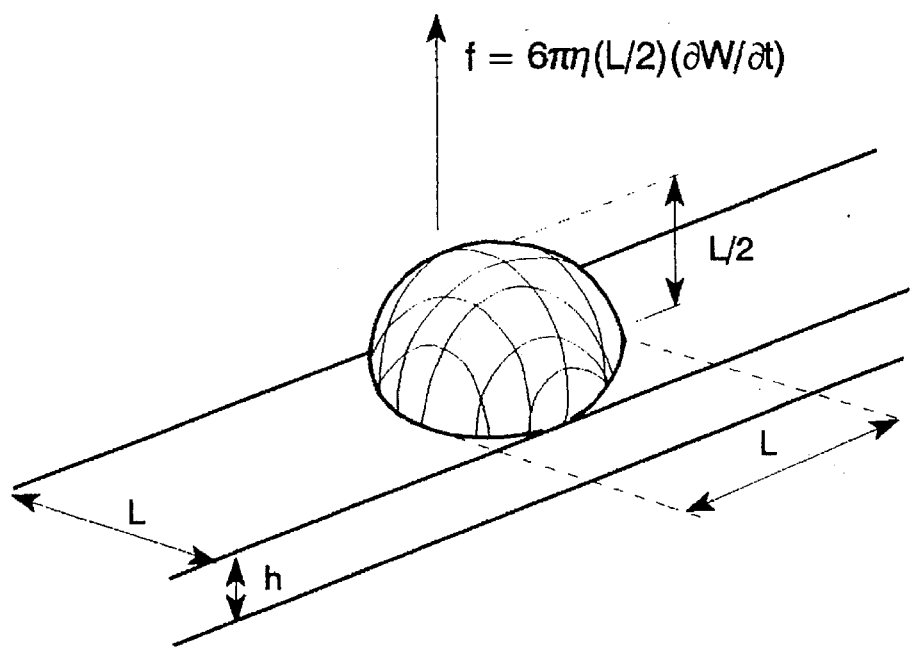

Together, the stress value z that can be appropriately obtained from the formula (17) and FIG. 8 based on the standardized power spectrum G(k) is greater than the stress value that the standardized power spectrum G(k) is at a minimum. For the minimum standardized power spectrum G(k), the quantitative relation between the angular frequency value ($y_k$) and stress value z is shown in FIG. 10 and is expressed by the following formula (21):

$$y_k = \omega_k/\omega = 143.2\sqrt{1 + 0.0073z} \quad (21)$$

In this quantitative relation, the angular frequency value ($y_k$) is proportional to the stress value z. Letting $z_m$ and $\omega_M/2\pi$ be the lower limit of a stress value z and the greatest oscillation frequency of oscillation components included in a compound oscillation of the straddle mounted beam oscillator, the greatest oscillation frequency $\omega_M/2\pi$ must be established such that the following condition is satisfied:

$$\omega_M < 143.2\sqrt{1 + 0.0073z_m} \quad (22)$$

Under these settings, while the semiconductor sensor is activated in a manner that the straddle mounted beam oscillator generates a compound oscillation consisting of a plurality of component oscillations having different frequencies $\omega_1/2\pi, \ldots$, and $\omega_n/2\pi$, amplitudes of the component oscillations having different frequencies $\omega_1/2\pi, \ldots$, and $\omega_n/2\pi$ are detected separately. A power spectrum, which has a squared value of each component amplitude, is standardized by the reference power spectrum which is the power spectrum established when there is no stress caused in the straddle mounted beam oscillator. In such a manner, standardized power spectra are established for the respective component oscillations. A stress value z is read on the correlation curves with reference to each standardized power spectrum. The mean value of the stress values thus obtained is calculated as a stress caused in the straddle mounted beam oscillator.

The detection of a stress caused in the straddle mounted beam oscillator of the semiconductor sensor is hardly susceptible to changes in environment such as ambient temperature around the straddle mounted beam oscillator and changes in physical characteristics of the straddle mounted beam oscillator due to aging, providing a precise result in the form of a stress value. Furthermore, there is no decrease in detecting resolution which occurs generally as stress increases. Because the smallest oscillation frequency $\omega_m/2\pi$ and the greatest oscillation frequency $\omega_M/2\pi$ of oscillation components included in a compound oscillation of the straddle mounted beam oscillator are established so as to satisfy the given conditions (20) and (22), respectively, the extent of stress values detectable appropriately is sufficiently broadened, resulting in a wide range of stress detection.

As apparent from the formulas (14) and (17) expressing the stress value z and standardized power spectrum G(k), respectively, which do not include n-different amplitudes $a_1$, ..., and an of component exciting amplitudes therein, the detection of a stress value representing a stress caused in the straddle mounted beam oscillator is free from the substantial effect of exciting amplitudes.

Further, the semiconductor sensor equipped with the straddle mounted beam oscillator is driven such that the straddle mounted beam oscillator generates a compound oscillation including n-different component oscillations with frequencies. The respective component amplitudes of the compound oscillation are detected and transformed into standardized power spectra after transformation into power spectra. On the basis of the standardized power spectra, stress values are obtained and averaged as the stress value generated in the straddle mounted beam oscillator.

Figure 2:
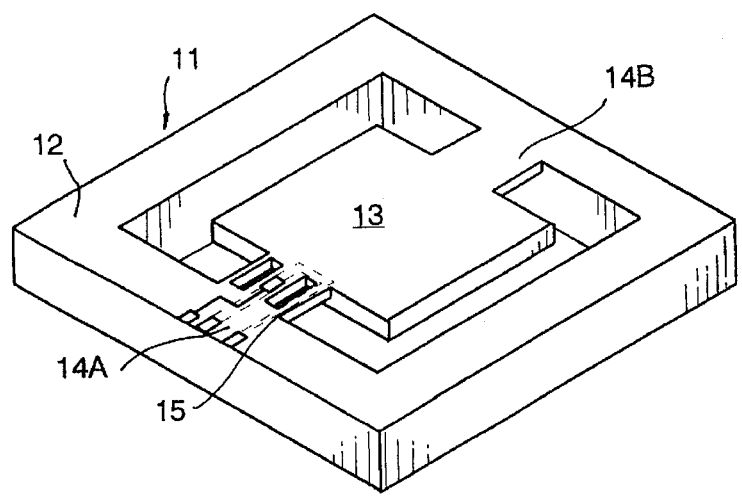
FIG. 2 is a perspective view of a semiconductor sensor used in the stress detecting apparatus shown in FIG. 1.

Referring to FIGS. 1 and 2 showing a stress detection apparatus according to an embodiment of the invention for embodying the stress detecting method, a semiconductor sensor 11 has a stress generating element, consisting of a straddle mounted beam type of oscillator, which generates stresses according to amounts of dynamic forces, such as pressure and the acceleration of gravity, acting thereon. As shown in detail by way of example in FIG. 2, the semiconductor sensor 11, which is made of a silicon wafer given etching treatment, has a frame 12 defining an approximately square space 12a, a weight element 13 having a square shape geometrically analogous to but smaller than the square space 12a, and supporting beams 14A and 14B integrally connecting opposite sides of the frame 12 and weight element 13, respectively. The supporting beams 14A and 14B generate a tensile stress or a compressive stress when the acceleration of gravity is exerted on the weight element 13 in a vertical direction. These weight element 13 and supporting beams 14A and 14B form the stress generating element for generating stresses according to amounts of external dynamic forces, such as pressure and gravity acceleration. Either one of the supporting beams 14A and 14B, for example the supporting beam 14A in this embodiment, is equipped with a straddle mounted beam type of oscillator (which is hereafter referred to simply as a straddle mounted beam oscillator) 15.

Figure 3:
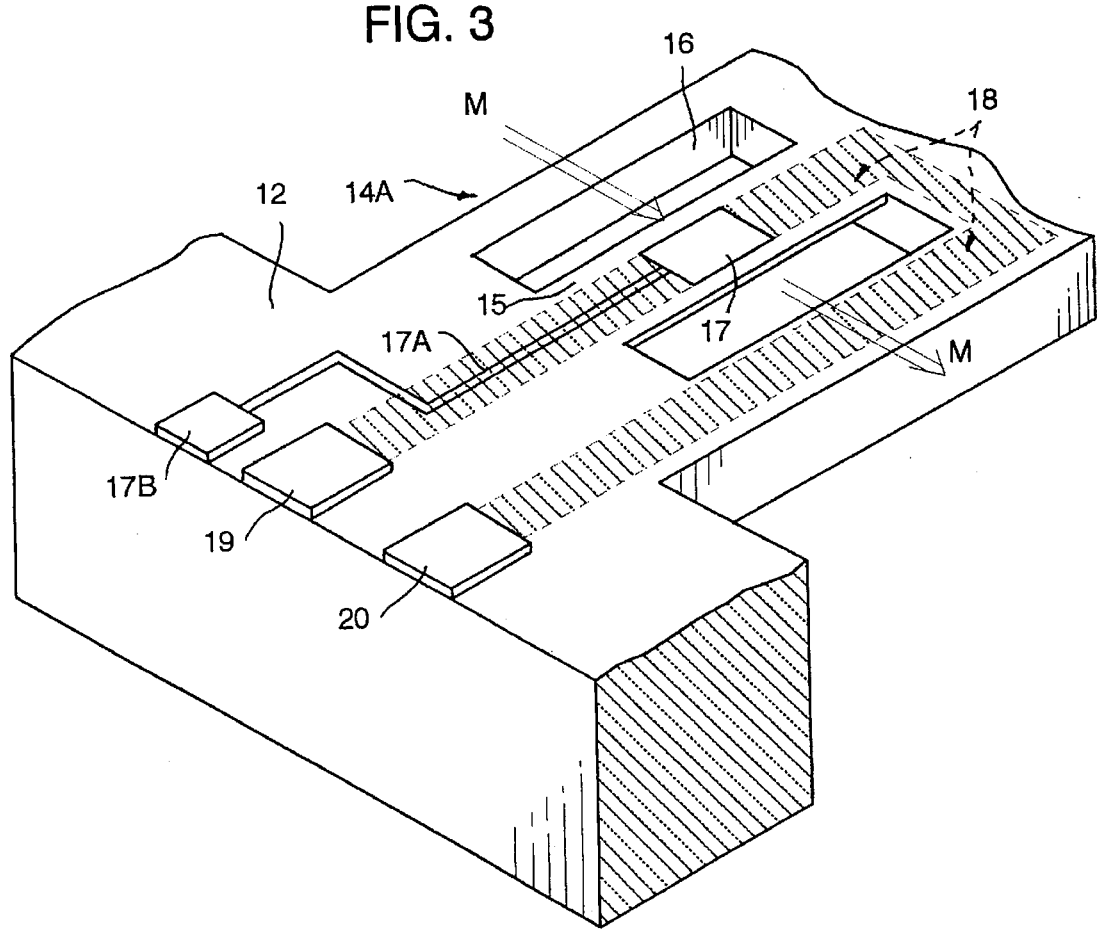
FIG. 3 is an enlarged view of an oscillator of the semiconductor sensor.
Figure 4:
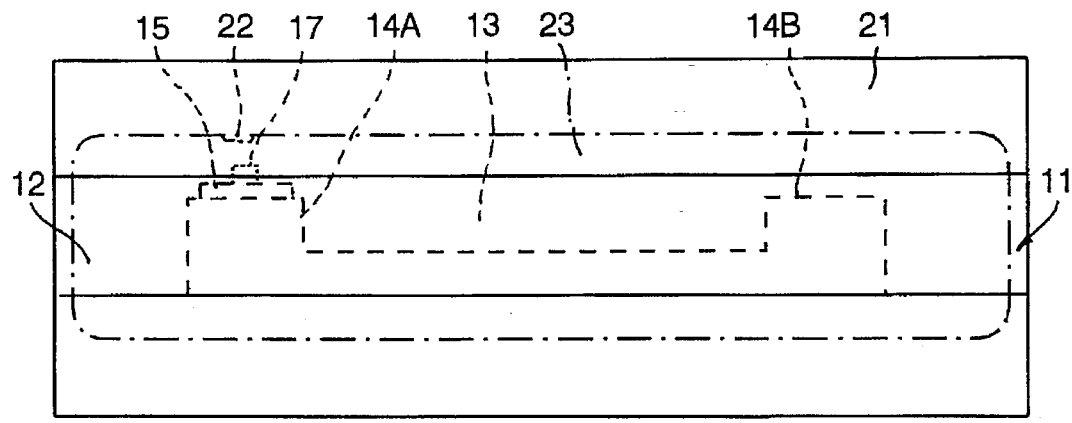
FIG. 4 is a side view of the semiconductor sensor.

FIG. 3 shows a configuration relating to the straddle mounted beam oscillator 15 in detail. The supporting beam 14A is formed with a generally rectangularly-shaped opening 16. The straddle mounted beam oscillator 15 extends in the lengthwise direction from one end to the other end of the opening 16 at the middle in the transverse direction and is integrally joined at both ends to the supporting beam 14A. At the center of the top of the straddle mounted beam oscillator 15 there is provided an electrode pad 17 connected to a terminal electrode 17B secured to the top of the frame 12 by means of a wire 17A. Since the straddle mounted beam oscillator 15 forms a part of the supporting beam 14A, a tensile stress or a compressive stress generated in the supporting beam 14A is exerted on the straddle mounted oscillator beam 15 when gravity acceleration is applied to the weight element 13 in the vertical direction. In other words, the straddle mounted beam oscillator 15 generates stresses according to amounts of dynamic forces.

As shown in FIG. 3, a continuous strip of P-type zone is formed as a generally U-shaped electric current path 18 having an extremely low resistance as compared with the frame 12 and supporting beam 14A on the top of part of the supporting beam 14A where the straddle mounted beam oscillator 15 lies, part of the supporting beam 14A extending on one side of the opening 16 and part of the frame 12 adjacent to the supporting beam 14A. The U-shaped electric current path 18 is attached at its extremities adjacent to one edge of the with electrode pads 19 and 20, respectively. The P-type zone continuous strip may be provided as a top layer, for instance, by doping impurities, such as boron, in the supporting beam 14A, or otherwise in a manner well known in the art. Specifically, the straddle mounted beam oscillator 15 has specified physical attributes, such as a length L of approximately 500 μm, a width of approximately 20 μm and a thickness of 3 μm. In the following discussion, the length, Cross-sectional area, density, second moment of area and Young's modulus of the straddle mounted beam oscillator 15 are represented by L, A, $\rho_0$, I and E, respectively.

For practical use of the semiconductor sensor 11 thus configured and shown in FIG. 2, it is enclosed in an evacuated glass casing 21. The glass casing 21 is configured so as to provide a space 23 for deformation or vibration of the weight element 13 and support beams 14A and 14B. The glass casing 23 has a stationary electrode pad 22 attached thereto and facing the electrode pad 17 at the central portion of the straddle mounted beam oscillator 15. This face to face arrangement of the electrode pads 17 and 22 provides an electrostatic capacity Cx therebetween according to an area and a distance defined by and between the electrode pads 17 and 22, and a dielectric constant in the vacuum. These electrodes 17B and 22 are connected to external terminals (not shown) by means of electrically conductive members.

In the stress detection apparatus shown in FIG. 1, a magnetic field generating circuit 25 provides a uniform magnetic field for the straddle mounted beam oscillator 15 such that a magnetic flux acts across the straddle mounted beam oscillator 15 in the transverse direction, in other words, the magnetic flux is at a perpendicular angle to the current path 18 lying on the straddle mounted beam oscillator 15. The stress detection apparatus has an n number of current sources $26U_1$ to $26U_n$ yielding alternating currents $U_1$ to $U_n$ which have frequencies $\omega_1/2\pi$ to $\omega_n/2\pi$ and amplitudes $a_1$ to $a_n$, respectively and are superposed through a current adder 27 as a compound current UM including the frequencies $\omega_1/2\pi$ to $\omega_n/2\pi$ and amplitudes $a_1$ to $a_n$. The compound current UM applied to the current path 18 of semiconductor sensor 11 through the terminal electrodes 19 and 20 and the magnetic field M interact over the straddle mounted beam oscillator 15.

Figure 5:
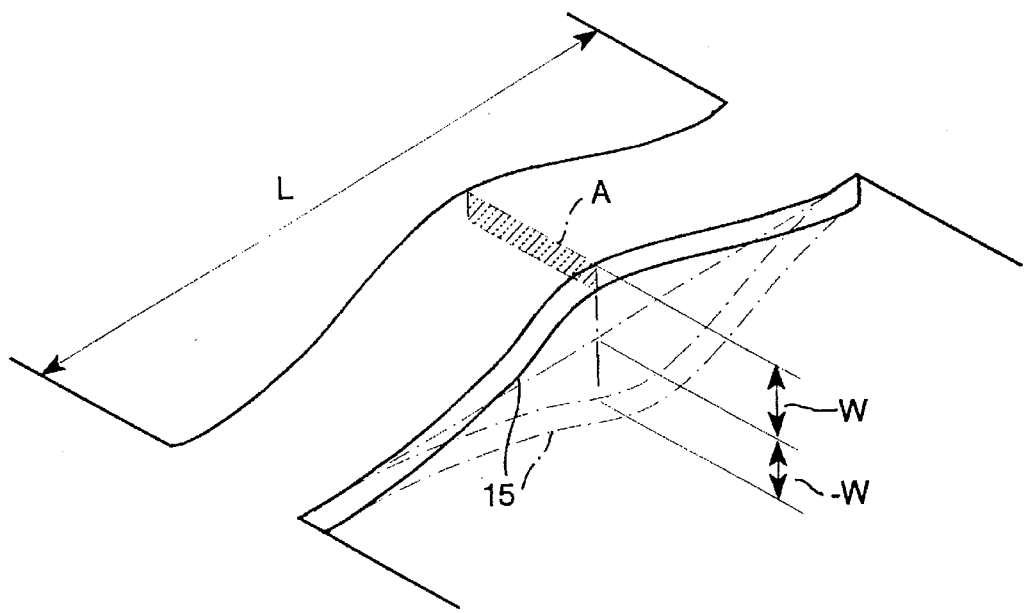
FIG. 5 is an enlarged perspective view of the stress generating member.

The interaction between the compound current UM and magnetic field M yields a force perpendicular to both directions of the compound current UM and magnetic field M, which in turn acts on the straddle mounted beam oscillator 15. As a result, the straddle mounted beam oscillator 15 generates a compound oscillation according to component frequencies of the compound current UM between two positions as shown, for instance, by broken line and solid line in FIG. 5. This compound oscillation includes component oscillations having the component frequencies $\omega_1/2\pi$ to $\omega_n/2\pi$. In this instance, the straddle mounted beam oscillator 15 changes the amplitude of oscillation W at its middle according to stresses generated therein. Accordingly, the amplitude W is detected as the stress of the straddle mounted beam oscillator 15. As apparent from the above description, the magnetic field generating circuit 25, current sources $26U_1$ to $26U_n$ and current adder 27 form an exciting means for exciting the straddle mounted beam oscillator 15 with exciting frequencies $\omega_1/2\pi$ to $\omega_n/2\pi$ and exciting amplitudes $a_1$ to $a_n$ so as to cause a compound oscillation consisting of component oscillations of different frequencies.

Figure 6:
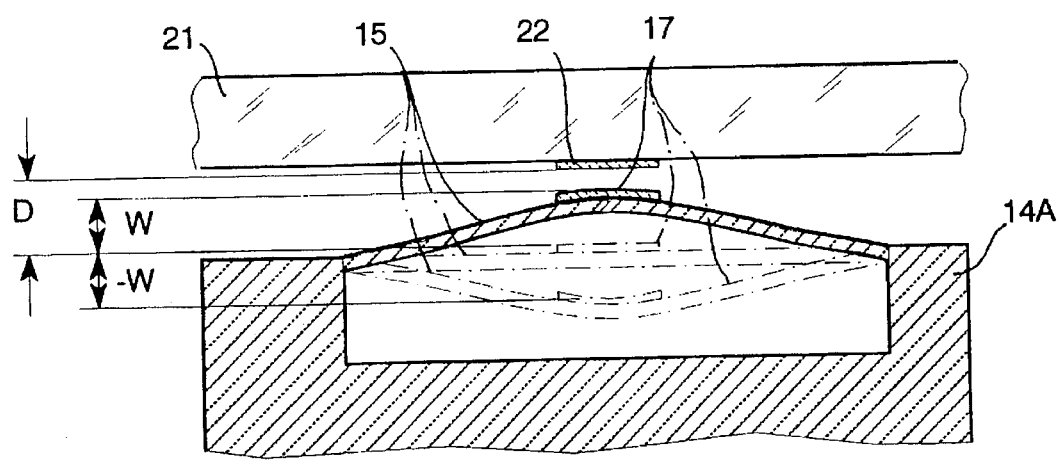
FIG. 6 is an enlarged cross-sectional view of the oscillator.

While the straddle mounted beam oscillator 15 generates a compound oscillation having component oscillations of frequencies $\omega_1/2\pi$ to $\omega_n/2\pi$, the distance between the electrode pads 17 and 22 as shown in FIG. 6. Letting D be the distance between the electrode pads 17 and 22 when the straddle mounted beam oscillator 15 is free from any oscillation, the compound oscillation increasingly or decreasingly changes the distance D by a distance equal to its amplitude W, with the result of a change in the electrostatic capacity Cx between the electrode pads 17 and 22 as expressed by the following formula (23).

$$Cx = \epsilon \cdot S/(D-W) \quad (23)$$

where $\epsilon$ is the dielectric constant in the vacuum; and

S is the facing area of the electrodes 17 and 22. Accordingly, the electrostatic capacity Cx, which is equivalent to the electrostatic capacity between the external terminal electrode 17B and the electrode pad 22, is detected as a substitution for the amplitude W of the straddle mounted beam oscillator 15 at the middle. The amplitude W is detected as an electrostatic capacity Cx between the electrodes 17B and 22 by means of an amplitude detector 28.

Figure 7:
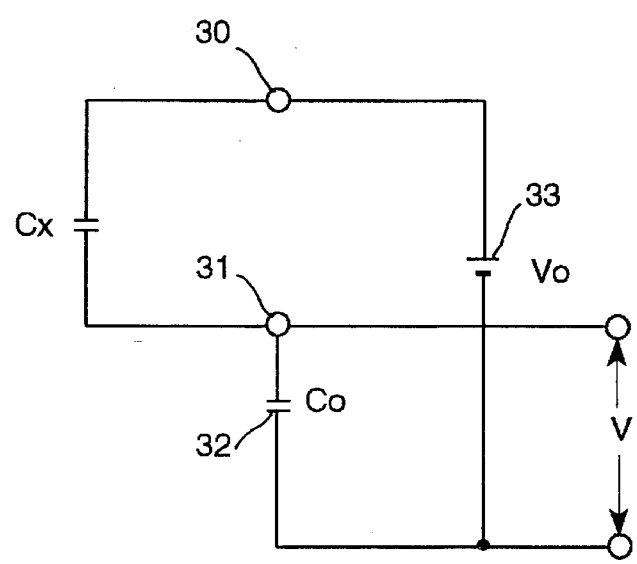
FIG. 7 is a circuit diagram showing an amplitude detection circuit of the oscillator.

As shown in FIG. 7, the amplitude detector 28 has interface terminals 30 and 31 connected to the electrodes 17B and 22, respectively, between which an electrostatic capacity Cx is provided as well as between the electrodes 17B and 22. Specifically, the amplitude detector 28 includes in its circuit a capacitance element 32 having a given reference electrostatic capacity Co and an electric power source 33 yielding a constant voltage Vo which are connected in series between the interface terminals 30 and 31. The voltage V across the capacitance element 32 has the quantitative relation to the electrostatic capacity Cx, reference electrostatic capacity Co and constant voltage Vo expressed by the following formula (24):

$$1/Cx = (Vo/V - 1)/Co \quad (24)$$

Substituting the formula (23) into the formula (24), the following formula (25) is obtained:

$$W = D\{(1 + \epsilon \cdot S/CoD) - (\epsilon \cdot S/CoD) \cdot (Vo/V)\} \quad (25)$$

The amplitude detector 28 detects an amplitude W of a compound oscillation of the straddle mounted beam oscillator 15 at the middle and provides an amplitude signal SW representative of the amplitude W for each of band pass filters $35F_1$ to $35F_n$.

The band-pass filters $35F_1$ to $35F_n$, which have frequency bands whose center frequencies are $\omega_1/2\pi$ to $\omega_n/2\pi$, respectively, extract components $SS_1$ to $SS_n$ of frequencies $\omega_1/2\pi$ to $\omega_n/2\pi$, respectively, from the amplitude signal SW. The component amplitude signals $SS_1$ to $SS_n$ filtered by the respective band-pass filters $35F_1$ to $35F_n$ and having component frequencies $\omega_1/2\pi$ to $\omega_n/2\pi$, respectively, represent amplitudes of component oscillations. In this manner, the band-pass filters $35F_1$ to $35F_n$ function as oscillation spectrum detectors which provide component frequencies $SS_1$ to $SS_n$ for square processing circuits $36Q_1$ to $36Q_n$, respectively, which in turn square the component frequencies $SS_1$ to $SS_n$ and provide signals $SQ_1$ to $SQ_n$ representative of the squared results, respectively. Subsequently, the signals $SQ_1$ to $SQ_n$ are transmitted to standardizing circuits $37N_1$ to $37N_n$ for standardization and also to output terminals $J_1$ to $J_n$ of the square processing circuits $36Q_1$ to $36Q_n$, respectively.

Because the signals $SQ_1$ to $SQ_n$ are obtained as a result of square processing of the component frequencies $SS_1$ to $SS_n$ representative of a number of n of oscillation spectra, they show a number of n of power spectra obtained by the square processing of oscillation spectra expressed by the formula (16). Thus, the square processing circuits $36Q_1$ to $36Q_n$ function as power spectrum calculation means for providing output signals $SQ_1$ to $SQ_n$ representative of a number of n of power spectra.

The standardizing circuits $37N_1$ to $37N_n$, to which squared power spectrum signals $SQ_1$ to $SQ_n$, receive data $DRP_1$ to $DRP_n$ representative of reference power spectra which are the power spectra established when there is no stress caused in the straddle mounted beam oscillator in a vacuum. The respective standardizing circuits $37N_1$ to $37N_n$ standardize the power spectra represented by the squared power spectrum signals $SQ_1$ to $SQ_n$ with the reference power spectrum data $DRP_1$ to $DRP_n$, respectively, and provide standardized spectrum signals $SNP_1$ to $SNP_n$ representative of the standardized power spectra G(k) for stress value detection means $39Z_1$ to $39Z_n$, respectively. In this instance, these reference power spectrum data are stored in a random access memory (RAM) 38.

The stress value detection means $39Z_1$ to $39Z_n$ receive data $DGX_1$ to $DGX_n$ from a random access memory (RAM) 40, respectively, as well as the standardized spectrum signals $SNP_1$ to $SNP_n$. The data $DGX_1$ to $DGX_n$ indicate the quantitative relations between standardized power spectra G(k) obtained from the formula (17) and stress values z and shown in FIG. 8 are previously stored in the random access memory (RAM) 40. The stress value detection means $39Z_1$ to $39Z_n$ found stress values $z_1$ to $z_n$, which represent $NL^2/EI$ (in which N is the stress generated in the straddle mounted beam oscillator 15), by comparing the standardized spectrum signals $SNP_1$ to $SNP_n$ with the data $DGX_1$ to $DGX_n$ and then output stress value signals $SZ_1$ to $SZ_n$ to an averaging circuit 41.

The averaging circuit 41 calculates a mean stress value za, such as a geometric mean stress value and a weighted mean stress value, of the stress values $z_1$ to $z_n$ which is employed as a stress value representative of the stress generated in the straddle mounted beam oscillator 15 and represented by a stress value signal SZA.

In a practical stress detection with the stress detection apparatus according to the above embodiment of the invention, upper and lower limits $z_M$ and $z_m$ are set for stress values which the stress value detection means $39Z_1$ to $39Z_n$ detect. Further, alternating currents $U_1$ to $U_n$ having frequencies $\omega_1/2\pi$ to $\omega_n/2\pi$ and amplitudes $a_1$ to $a_n$ yielded, respectively, from the current sources $26U_1$ to $26U_n$ are regulated such that a smallest oscillation frequency $\omega_m/2\pi$ and a greatest oscillation frequency $\omega_M/2\pi$ satisfy the following conditions (26) and (27), respectively:

$$\omega_m > 44.4 \sqrt{1 + 0.025 z_M} \quad (26)$$

$$\omega_M < 143.2 \sqrt{1 + 0.0073 z_m} \quad (27)$$

Subsequently, by the utilization of the formula (17) relating to the standardized power spectrum G(k), quantitative relations between the standardized power spectrum G(k) and stress value z and data $DGX_1$ to $DGX_n$ are established with regard to the frequencies $\omega_1/2\pi$ to $\omega_n/2\pi$ and stored in the random access memory (RAM) 40.

Under the condition where the straddle mounted beam oscillator 15 is free from any stress, while the magnetic field generating circuit 25 is activated to apply a uniform magnetic field over the straddle mounted beam oscillator 15, the semiconductor sensor 11 is excited with the current path 18 applied with a compound current UM consisting of superposed alternating currents $U_1$ to $U_n$ from the respective current sources $26U_1$ to $26U_n$ through the current adder 27. As a result, the straddle mounted beam oscillator 15 generates a compound oscillation consisting of component oscillations of frequencies $\omega_1/2\pi$ to $\omega_n/2\pi$ according to the alternating currents $U_1$ to $U_n$ having frequencies $\omega_1/2\pi$ to $\omega_n/2\pi$ and amplitudes $a_1$ to $a_n$, respectively. At this time, the alternating currents $U_1$ to $U_n$ has the smallest oscillation frequency $\omega_m/2\pi$ and greatest oscillation frequency $\omega_M/2\pi$ satisfy the conditions (26) and (27), respectively. During the compound oscillation of the straddle mounted beam oscillator 15, squared power spectrum signals $SQ_1$ to $SQ_n$ are provided by the square processing circuits $36Q_1$ to $36Q_n$ and output through the output terminals $J_1$ to $J_n$ as reference power spectra which correspond to the power spectra $(F(L/2, \mu))^2$ obtained while the straddle mounted beam oscillator 15 is free from any stress. Data $DRP_1$ to $DRP_n$ of the reference power spectra is free from any stress are provided and stored in the random access memory (RAM) 38.

Once having stored the data $DGX_1$ to $DGX_n$ indicating the quantitative relations between the standardized power spectrum G(k) and stress value z in the random access memory (RAM) 40 and the data $DRP_1$ to $DRP_n$ of the reference power spectra in the random access memory (RAM) 38, while a specified amount of dynamic force, such as a gravity acceleration, is applied to the straddle mounted beam oscillator 15 so as to generate a stress in the straddle mounted beam oscillator 15, a uniform magnetic field is applied over the straddle mounted beam oscillator 15 and a compound current UM consisting of superposed alternating currents $U_1$ to $U_n$ from the respective current sources $26U_1$ to $26U_n$ is applied to the current path 18 through the current adder 27, so as to cause the semiconductor sensor 11 to generate a compound oscillation consisting of component oscillations of frequencies $\omega_1/2\pi$ to $\omega_n/2\pi$ in the straddle mounted beam oscillator 15.

During the compound oscillation of the straddle mounted beam oscillator 15, the respective standardizing circuits $37N_1$ to $37N_n$ standardize the power spectra represented by the squared power spectrum data $DRP_1$ to $DRP_n$ from the square processing circuits $36Q_1$ to $36Q_n$ with the Data $DRP_1$ to $DRP_n$ of the reference power spectra extracted from the random access memory (RAM) 38 and provide standardized spectrum signals $SNP_1$ to $SNP_n$ as standardized power spectra. Together, the stress value detection means $39Z_1$ to $39Z_n$ compare the standardized spectrum signals $SNP_1$ to $SNP_n$ representing the respective standardized power spectra with the data $DGX_1$ to $DGX_n$ extracted from the random access memory (RAM) 40 which represent the quantitative relations between the standardized power spectra G(k) and stress values z and find stress values $z_1$ to $z_n$ appropriately corresponding to the respective standardized power spectra. Since these stress values $z_1$ to $z_n$ are obtained based on the component frequencies $SS_1$ to $SS_n$ of frequencies $\omega_1/2\pi$ to $\omega_n/2\pi$ provided through the band-pass filters $35F_1$ to $35F_n$, respectively, and hence, based on the oscillation spectra corresponding to the oscillation spectrum $F_k(L/2, \mu)$ represented by the formula (16). The stress value detection means $39Z_1$ to $39Z_n$ output stress value signals $SZ_1$ to $SZ_n$ to the averaging circuit 41 where a weighted mean stress value zw of the stress values $z_1$ to $z_n$ is calculated for instance.

Letting $W_1$ to $W_n$ be weighing factors for the stress values $z_1$ to $z_n$, respectively, the weighted mean stress value zw is given by the following formula (28):

$$zw = (W_1 z_1 + \ldots + W_n z_n)/(W_1 + \ldots + W_n) \tag{28}$$

In establishing these weighing factors $W_1$-$W_n$, letting G(k) (in which k assumes 1, ..., n), $\Delta G(k)$, H, $z_0$ and $|\Delta z_k|$ be standardized power spectra represented by standardized spectrum signals $SNP_1$ to $SNP_n$, a detection error in relation to the standardized power spectrum and the maximum value of $|\Delta G(k)|/G(k)$, a true stress value of each stress values $z_1$–$z_n$, and the maximum error of each stress values $z_1$–$z_n$, respectively, the following quantitative relations are satisfied:

$$|\Delta G(k)| = \Delta z_k \cdot dG(k)/dz \tag{29}$$

$$|\Delta z_k| = |\Delta G(k)| \cdot [1 \div \{dG(k)/dz\}] = H \cdot G(k) \cdot [1 \div \{dG(k)/dz\}] \tag{30}$$

As apparent from the formula (30), $|\Delta z_k|$ decreases as $dG(k)/dz$ increases provided that the stress value z is greater than 0 (zero), with the result of increasing detecting resolution concerning stress values z. On the other hand, provided that the stress value z is less than 0 (zero), G(k) reaches a minimum and $dG(k)/dz$ reaches 0 (zero), respectively, as $|z|$ increases, resulting in an increase of $|\Delta z_k|$ which causes aggravation of detecting resolution concerning stress values z.

Letting $\Delta z_1'$–$\Delta z_n'$ be errors included in stress values $\Delta z_1$–$\Delta z_n$ corresponding to standardized power spectra G(1) –G(n), respectively, the geometric mean stress value zs is defined as follows:

$$zs = z_0 + (\Delta z_1' + \ldots + \Delta z_n')/n \tag{31}$$

Since there must be an upper limit for an error of a true value $z_0$ of the geometric mean stress value zs, the maximum error $\delta_m$ is defined by the following formula (32):

$$\begin{aligned}|zs - z_0| &= |\Delta z_1' + \ldots + \Delta z_n'|/n < \\ &\quad \{|\Delta z_1'| + \ldots + |\Delta z_n'|\}/n < \\ &\quad \{|\Delta z_1| + \ldots + |\Delta z_n|\}/n \\ &= (H/n) \cdot [G(1)/\{dG(1)/dz\} + \ldots + G(n)/\{dG(n)/dz\}] \\ &= \delta_s\end{aligned} \tag{32}$$

With use of the weighing factors indicated by the following monomials (33) for $z_0 + \Delta z_1'$, ..., $z_0 + \Delta z_n'$ which are the stress values $z_1$, ..., $z_n$ corresponding to the standardized power spectra G(1), ..., G(n), the weighted mean stress value zw' is formulated as the formula (34).

$$\left.\begin{array}{c}\{1/G(1)\} \cdot \{dG(1)/dz\} \\ \cdot \\ \cdot \\ \cdot \\ \{1/G(n)\} \cdot \{dG(n)/dz\}\end{array}\right\} \tag{33}$$

$$zw' = z_0 + [\Delta z_1' \cdot \{1/G(1)\}\{dG(1)/dz\} + \ldots + \tag{34}$$

-continued $$\Delta z_j' \cdot \{1/G(n)\}\{dG(n)/dz\} \div$$

$$[\{1/G(1)\}\{dG(1)/dz\} + \ldots + \{1/G(n)\}\{dG(n)/dz\}]$$

The maximum error $\delta_w$ of a true value $z_0$ of the weighted mean stress value zw is formulated as follows:

$$\begin{aligned}
|zw - z_0| &< [|\Delta z_1| \cdot \{1/G(1)\}\{dG(1)/dz\} + \ldots + \\
&\quad |\Delta z_n| \cdot \{1/G(n)\}\{dG(n)/dz\}] \div \\
&\quad [\{1/G(1)\}\{dG(1)/dz\} + \ldots + \{1/G(n)\}\{dG(n)/dz\}] \\
&= nz/[\{1/G(1)\}\{dG(1)/dz\} + \ldots + \\
&\quad \{1/G(n)\}\{dG(n)/dz\}] \\
&= \delta_w
\end{aligned}$$
(35)

Directing concern to dimensions of the maximum errors $\delta_s$ and $\delta_w$ and the theorem that a geometric mean is greater than a harmonic mean, the following conditions must be satisfied:

$$\delta_s > H^n \cdot [\{G(1) \times \ldots \times G(n)\}/\{dG(1)/dz \times \ldots \times dG(n)/dz\}]^{1/2}$$ (36)

$$\delta_w < H^n \cdot [\{G(1) \times \ldots \times G(n)\}/\{dG(1)/dz \times \ldots \times dG(n)/dz\}]^{1/2}$$

From the conditions, it is proved that the maximum error $\delta_s$ of the true value $z_0$ of a geometric mean stress value zs is greater the maximum error $\delta_w$ of the true value $z_0$ of a weighted mean stress value zw'. Accordingly, the maximum error is smaller for the weighted mean stress value zw' obtained from the formula (33) in which weighing factors are incorporated than for the geometric mean stress value zs in regard to each stress value $z_1 \ldots z_n$. The utilization of weighted means stress values is contributory to improvement on the detecting resolution of stress values.

In view of the above, the weighing factors $W_1 \ldots W_n$ are set for the respective stress values $W_1 \ldots W_n$ the averaging circuit 41 as follows:

$$\left.\begin{aligned}
W_1 &= \{1/G(1)\}\{dG(1)/dz\} \\
&\quad . \\
&\quad . \\
&\quad . \\
W_n &= \{1/G(n)\}\{dG(n)/dz\}
\end{aligned}\right\}$$
(37)

The weighted mean zw obtained in the averaging circuit 41 is substituted for a mean stress value za, which is employed as the stress generated in the straddle mounted beam oscillator 15 and output as a stress value signal SZA through the terminal 42. In FIG. 1, the random access memory (RAM) 43, which provides various exciting conditions, has five internal memory sections, namely A section for various amplitudes for the respective frequencies, B section and E section for amplitude strength rations, C section for various spectrum strength and D section for various spectrum strength ratios.

In the detection of stress described above, the straddle mounted beam oscillator 15 assumes a state that there is no residual stresses left therein or there are left only residual stresses that are substantially negligible or insignificant. The stress detecting method of the invention is appropriately available even in the cases where there are residual stresses which are significant to some extent.

In the cases where the straddle mounted beam oscillator 15 has residual stresses, the oscillation spectrum $F_k(L/2, \mu)$ represented by the formula (16) is calculated on condition that there is no stress generated in the straddle mounted beam oscillator 15, i.e. on condition that the stress value z is 0 (zero). The oscillation spectrum $F_k(L/2, \mu)$ is squared in order to provide a theoretical power spectrum $(F_k(L/2, \mu))^2$ for the straddle mounted beam oscillator 15 having no residual stress. With regard to the straddle mounted beam oscillator 15 which is placed in a condition that it has a residual stress but does not generate any stress due to an external dynamic force such as a gravity acceleration, power spectra which are represented by power spectrum signals $SQ_1$ to $SQ_n$ from the square processing circuits $36Q_1$ to $36Q_n$ are standardized with the theoretical power spectra $(F_k(L/2, \mu))^2$ provided when the straddle mounted beam oscillator 15 has no residual stress. The standardized power spectra are defined as the standardized power spectra $G(k, z_v)$ for the straddle mounted beam oscillator 15 has only a residual stress. Each standardized power spectrum $G(k, z_v)$ is compared with the data $DGX_1$ to $DGX_n$ extracted from the random access memory (RAM) 40 which represent the quantitative relations between the standardized power spectra $G(k)$ and stress values z to find a stress value z appropriately corresponding to the respective standardized power spectrum $G(k, z_v)$ which in turn is substituted for the residual stress value $z_v$ of the straddle mounted beam oscillator 15.

Thereafter, in a condition that the straddle mounted beam oscillator 15 has a residual stress and generates a stress due to an external dynamic force such as a gravity acceleration, power spectra which are represented by power spectrum signals $SQ_1$ to $SQ_n$ from the square processing circuits $36Q_1$ to $36Q_n$ are standardized with the theoretical power spectra $(F_k(L/2, \mu))^2$ provided when the straddle mounted beam oscillator 15 has no residual stress. The standardized power spectra are defined as the standardized power spectra $G(k, z+z_v)$ for the straddle mounted beam oscillator 15 has both residual stress and stress due to an external dynamic force. Each standardized power spectrum $G(k, z_v)$ is compared with the data $DGX_1$ to $DGX_n$ extracted from the random access memory (RAM) 40 which represent the quantitative relations between the standardized power spectra $G(k)$ and stress values z to find a stress value z appropriately corresponding to the respective standardized power spectrum $G(k, z+z_v)$ which in turn is substituted for the compound stress value $z_c$ (=$z+z_v$) of the straddle mounted beam oscillator 15. The stress value z generated in the straddle mounted beam oscillator 15 due to the external dynamic force is obtained by subtracting the residual value $z_v$ from the compound stress value $z_c$. In this manner, the stress value z generated in the straddle mounted beam oscillator 15 due to the external dynamic force is obtained without being affected by a residual stress.

The stress detection may be performed based on an analysis of the influence of are resistance on a distribution of amplitude of oscillations generated in a stress generating element of the semiconductor sensor.

In order to quantitatively express an effect of air resistance in the analysis, the utilization is made of Stokes' law of resistance according to which the resistance acting on an object moving at a speed in a viscous fluid such as air is opposite to the direction of movement and proportional to the speed.

Applying the Stokes' law of resistance to the straddle mounted beam oscillator 15 as a stress generating element of the semiconductor sensor shown in FIG. 2, the following formula is obtained on referring to the formula (3) by introducing a resistance $\partial W/\zeta t$ exerted on the straddle mounted beam oscillator 15.

$$EI \cdot \partial^4 W/\zeta \partial^4 - N \cdot \partial^2 W/\zeta \partial^2 +$$  (38)

-continued $$\rho_0 A \cdot \partial^2 W/\zeta t^2 + R \cdot \partial W/\zeta t = M \sum_{p=1}^{\eta} a_p \cdot e^{i\omega pt}$$

$W(0, t) = W(L, t) = 0$ $W_\eta(0, t) = W_\eta(L, t) = 0$ where R is a constant.

Solving the formula (38) for $\partial = L/2$ to obtain an approximate solution, the following formula is obtained:

$$W(L/2, t) = M\Sigma(a_p/\rho_0 A \omega_p^2) \times \quad (39)$$

$$[\{\upsilon_p \sinh\upsilon_p(1 - \cos\lambda_p) + \lambda_p \sin\lambda_p(1 - \cosh\upsilon_p)\} \div$$

$$\{(\upsilon_p \sinh\upsilon_p \cdot \cos\lambda_p + \upsilon_p \sin\lambda_p \cdot \lambda \cosh\upsilon_p)\}] \cdot e^{i\omega pt}$$

In this instance, the following condition is satisfied:

$$1+(\rho_0 A/R)^2 \cdot \omega_p^2 > \{(\upsilon_p \sin h\upsilon_p + \lambda_p \sin \lambda_p) \div (\rho_p \sin h\rho_p \cdot \cos \lambda_p + \sin \lambda_p \cdot \lambda \cos h\upsilon_p)\}^2 \quad (40)$$

In the condition (40), while $\delta(\mu')$ is a delta function for $\mu'$ defined by $(\mu - \omega_p/2\pi)$ and assumes an infinity when $\mu$ is 0, $\delta(\mu')$ is explained to assume 1 as the unit of spectrum in the following description.

When calculating a spectrum $W(L/2, t)$, which is discrete, for a frequency $\omega_p/2\pi$ from the formula (39), $$F(P, z, R) = Ma_p/\rho_0 A\omega_p^2 - R_1\omega_p) \times \quad (41)$$

$$[\{\upsilon_p \sinh\upsilon_p(1 - \cos\lambda_p) + \lambda_p \sin\lambda_p(1 - \cosh\upsilon_p)\} \div$$

$$\{(\upsilon_p \sinh\upsilon_p \cdot \cos\lambda_p + \upsilon_p \sin\lambda_p \cdot \lambda \cosh\upsilon_p)\}] \cdot e^{i\omega pt}$$

Since in the formula (41) $Ma_p/\rho_0 A\omega_p^2 - R_1\omega_p)$ is canceled the standardized power spectrum, which is defined by the spectrum strength $|F(p, z, R)|^2$ and $|F(p, 0, R)|^2$, is identical to the formula (17) and expressed as follows:

$$|F(p, z, R)|^2/|F(p, 0, R)|^2 = G(p, z) G(K) \quad (42)$$

That is, as long as the condition (40) is satisfied, the stress value z is found from the standardized power spectrum if the spectrum strength $|F(p, 0, R)|$ is known.

The feasibility of the condition (40) as a premise for the approximate solution of the formula (39) must be studied hereafter.

Discussing the constant R, when replacing part of the straddle mounted beam oscillator 15 having a width of b with a hemisphere having a radius of b/2, the resistance force f' that the hemisphere receives is given by the following formula (43):

$$f = 6\pi\rho(b/2) \cdot (\partial W/\zeta t) \quad (43)$$

where η is the viscosity factor of air.

Since the friction force per unit length received by the straddle mounted beam oscillator 15 is given by f'/b and the viscosity factor of air η is approximately $2 \times 10^{-5}$ under the condition of room temperatures and an atmospheric pressure, the resistance factor R can be generally estimated as one expressed by the following formula (44):

$$R = 3\pi\eta = 1.89 \times 10^{-4} \text{ kg/ms} \quad (44)$$

Since the straddle mounted beam oscillator 15 made of a silicon wafer after etching treatment has specified physical dimensions, such as a length L of approximately 500 μm, a width b of approximately 20 μm and a thickness h of 3 μm, and the silicon has a density $\rho_0$ of $2.3 \times 10^{-3}$ kg/m$^3$, the Young's modulus of $1.7 \times 10^{11}$ kg/s$^2 \cdot$m, and a second moment of area of $bh3/12 = 4.50 \times 10^{-23}$ m$^4$, $\rho_0 A$ and $\omega_p$ are expressed as follows:

$$\rho_0 A = 1.38 \times 10^{-7} \text{ kg/m} \quad (45)$$

$$\omega_p = y_p \sqrt{EI/4\rho_0 AL^4} = 1.49 \times 10^4 \, y_p(1/S) \quad (46)$$

The left side of the condition (40) can be rewritten as follows:

$$1 + (\rho_0 A/R)^2 \cdot \omega_p^2 = 1 + 1.18 \times 10^2 \cdot y_p \quad (47)$$

Calculating the formula (46) for various parameters $y_p$, for instance 60, 70, 80, 90 and 100, the results are given in the following table.

| $Y_p$ | $1 + (\rho_0 A/R)^2 \cdot \omega_p^2$ |
| --- | --- |
| 60 | $4.25 \times 10^5$ |
| 70 | $5.78 \times 10^5$ |
| 80 | $7.55 \times 10^5$ |
| 90 | $9.56 \times 10^5$ |
| 100 | $1.18 \times 10^6$ |

Figure 12:
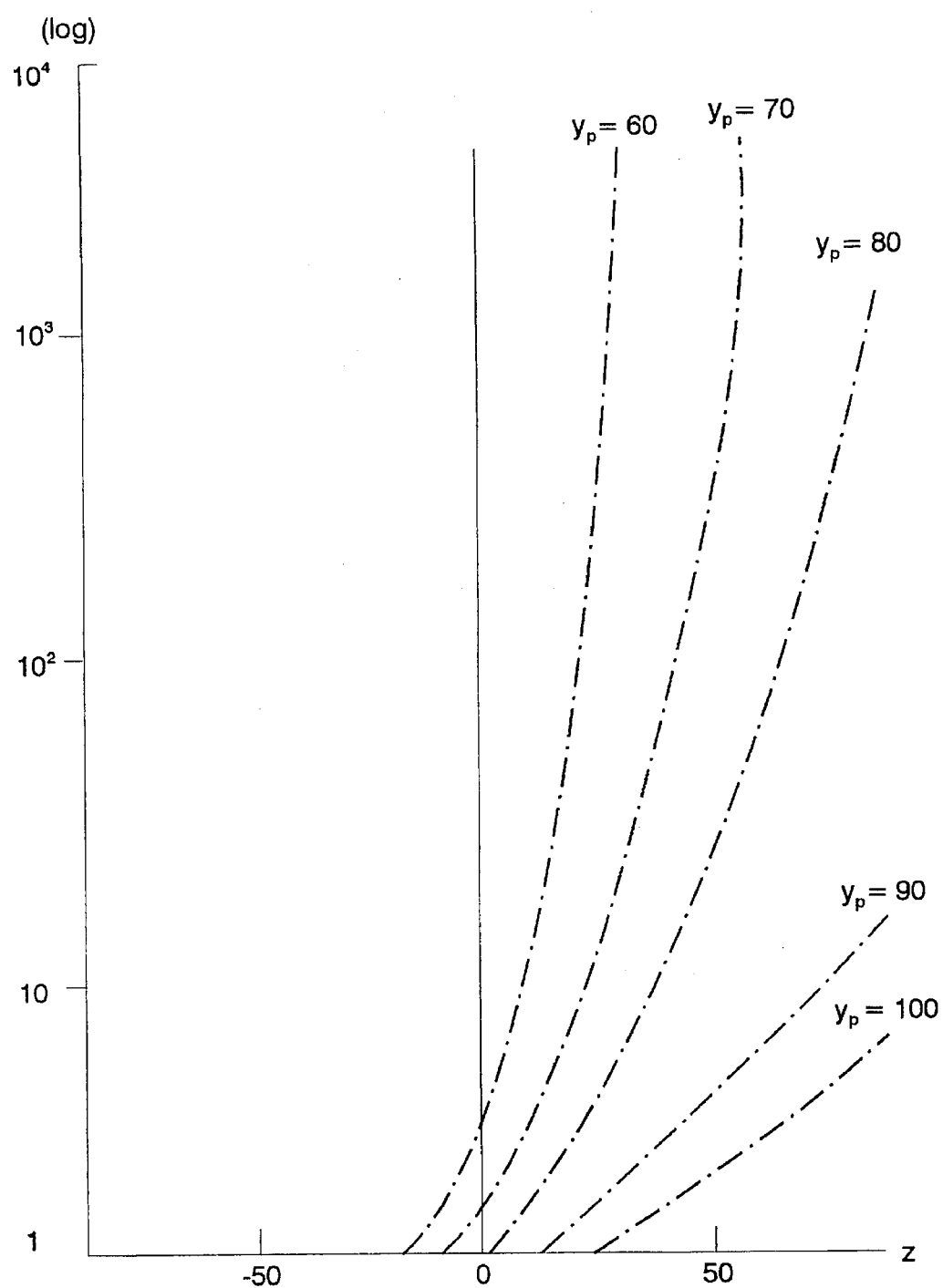
FIG. 12 is a diagram showing a quantitative relation between resonant frequency and stress value.

The right side of the condition (40) is expressed as a function of stress value z and shown in FIG. 12. As apparent in FIG. 12, while the power spectrum for a stress value z at which each parameter $y_p$ provides a resonant frequency shows an abrupt divergent increase, the value of the right side of the condition (40) becomes smaller as the parameter becomes far from the resonant frequency. That is, when setting a stress detection limit to the parameter $y_p$ at a point at which the right side of the condition (40) assumes a value of the order of approximately $10^3$, the left side of the condition (40) assumes a value over the order of $10^2$ and consequently, the formula is held.

The following description will be given to provide a substantiated argument for compensation for an error in stress detection due to air resistance.

Considering spectra for frequencies $\omega_q$ and $\omega_r$ (q≠r) among the frequencies $\omega_p$ (p=1, 2, ..., n), the quantitative relation is established between a spectrum strength ratio $X_R$ and an amplitude ratio $Y_R$ for the frequencies $\omega_q$ and $\omega_r$ as follows:

$$\begin{aligned} X_R &= |F(q, z_0, R)|^2 \div |F(r, z_0, R)|^2 \quad (48) \\ &= (|a_q{}^R|^2/|a_r{}^R|^2) \times (\omega_r{}^2/\omega_q{}^2) \times \\ &\quad \{(\rho_0 A)^2 \cdot (\omega_r{}^2 + R^2)/(\rho_0 A)^2 \cdot (\omega_q{}^2 + R^2)\} \times \\ &\quad \{\phi(z_0, \omega_q)/\phi(z_0, \omega_r)\} \\ &= Y_R \times (\omega_r{}^2/\omega_q{}^2) \times \{(\rho_0 A)^2 \cdot (\omega_r{}^2 + R^2)/(\rho_0 A)^2 \cdot (\omega_q{}^2 + R^2)\} \times \\ &\quad \{\phi(z_0, \omega_q)/\phi(z_0, \omega_r)\} \end{aligned}$$

In the formula, $\phi(z_0, \omega_p)$ is defined as follows:

$$\phi(z_0/\omega_p) = [\{\upsilon_p \sin h\upsilon_p(1-\cos \lambda_p) + \lambda_p \sin \lambda_p(1-\cos h\upsilon_p)\} \div \{(\upsilon_p \sin h\upsilon_p \cdot \cos \lambda_p + \upsilon_p \sin \lambda_p \cdot \lambda \cos h\upsilon_p)\}]^2 \quad (49)$$

Letting $X_o$ and $Y_o$ be the spectrum strength ratio and amplitude strength ratio of exciting force when the straddle mounted beam oscillator 15 is in a vacuum (R=0), the following formula is obtained on referring to the formula (48):

$$X_0 = Y_0 \times (\omega_r^4/\omega_q^4) \times \{?(z_0, \omega_q)/\phi(z_0, \omega_r)\} \quad (50)$$

Solving the formulas (48) and (50) for $R^2$, the following formula is obtained:

$$R^2 = (\rho_0 A)^2 \omega_r^2 \omega_q^2 (X_0 Y_R - X_R Y_0)/(\omega_r^2 X_R Y_0 - \omega_q^2 X_0 Y_R) \quad (51)$$

Substituting the formula (51) for the formula (41), $$\begin{aligned} |F(q,z_0,R)|^2 &= \{M^2 |a_q^R|^2(\omega_r^2 X_R Y_0 - \omega_q^2 X_0 Y_R)/ \\ &\quad (\rho_0 A)^2 \omega_q^4(X_0 Y_R(\omega_r^2 - \omega_q^2))\} \times \phi(z_0, \omega_q) \\ &= (|a_q^R|^2/|a_q^0|^2)\{(\omega_r^2 X_R Y_0 - \omega_q^2 X_0 Y_r)/ \\ &\quad (X_0 Y_R(\omega_r^2 - \omega_q^2))\} \times \\ &\quad \{M^2 |a_q^0|^2/(\rho_0 A)^2 \omega_q^4\} \times \phi(z_0, \omega_q) \\ &= (|a_q^R|^2/|a_q^0|^2)(\omega_r^2 X_R Y_0 - \omega_q^2 X_0 Y_R)/ \\ &\quad (X_0 Y_R(\omega_r^2 - \omega_q^2)) \times |F(q,z_0,0)|^2 \end{aligned} \quad (52)$$

Similarly, $$|F(r, z_0, R)|^2 = (|a_r^R|^2/|a_r^0|^2)(\omega_r^2 X_R Y_0 - \omega_q^2 X_0 Y_R)/(X_0 Y_R(\omega_r^2 - \omega_q^2)) \times |F(r, z_0, 0)|^2 \quad (53)$$

The above formulas (52) and (53) represent the spectrum strength of the frequencies $\omega_q$ and $\omega_r$ for the resistance factors R=0 and R≠0.

Considering the case where the straddle mounted beam oscillator 15 has no residual stress (stress value $z_0=0$), thespectrum strength is obtained by substituting 0 (zero) for $z_0$ in the formula (52), (53) as follows:

$$|F(q, 0, R)|^2 = (|a_q^R|^2/|a_q^0|^2)(\omega_r^2 X_R Y_0 - \omega_q^2 X_0 Y_R)/(X_0 Y_R(\omega_r^2 - \omega_q^2)) \times |F(q, 0, 0)|^2 \quad (54)$$

$$|F(r, 0, R)|^2 = (|a_r^R|^2/|a_r^0|^2)(\omega_r^2 X_r Y_0 - \omega_q^2 X_0 Y_R)/X_0 Y_R(\omega_r^2 - \omega_q^2) \times |F(r, 0, 0)|^2 \quad (55)$$

Since the spectrum strength are expressed by rewriting the formula (13) as described below, they are theoretically determined when the basis of practical physical characteristics ($\rho_0$, E), dimensions (L, A, I) and exciting conditions ($a_q^R$, $a_q^0$, $\omega_q$, $\omega_r$) are unconditionally fixed.

In the practical a procedure for the compensation for an error in stress detection due to air resistance, if the straddle mounted beam oscillator 15 has a residual stress generated, for instance, during manufacturing, the residual stress is used for the true stress value $z_0$.

(i) In the case where the amplitude strength ratios $Y_R$ and $Y_0$ are equal to each other:

(1) The amplitude strength ratio $Y_0$ is determined based on exciting amplitude strength $|a_q^0|^2$ and $|a_r^0|^2$ which are arbitrarily established, and spectrum strength $|F(q, 0, 0)|^2$ and $|F(r, 0, 0)|^2$ are theoretically determined based on the amplitude strength ratio $Y_0$.

(2) While the straddle mounted beam oscillator 15 is left in a vacuum (resistance factor R=0), it is excited with the arbitrarily determined exciting amplitude strength $|a_q^0|^2$ and $|a_r^0|^2$. During the excitation, practical spectrum strength $|F(q, z_0, 0)|^2$ and $|F(r, z_0, 0)|^2$ are observed and a spectrum strength ratio $X_0 = |F(q, z_0, 0)|^2/|F(r, z_0, 0)|^2$ is determined.

(3) From the results, the standardized spectrum strength ratios $G(q, z_0) = |F(q, z_0, 0)|^2/|F(q, 0, 0)|^2$ and $G(r, z_0) = |F(r, z_0, 0)|^2/|F(r, 0, 0)|^2$ are calculated, on the basis of which the residual stress value $z_0$ is found from the quantitative relations between standardized power spectrum and stress value z shown in FIG. 8. In order to increase the reliability of residual stress value $z_0$, the values $z_0^q$ and $z_0^r$ may be obtained from the standardized spectrum strength ratios G (q, $z_0$) and G (r, $z_0$), respectively, as weighted means.

(4) While the straddle mounted beam oscillator 15 is left in the air (resistance factor R≠0), the exciting amplitude strength $|a_q^R|^2$ and $|a_r^R|^2$ are determined such that the strength ratios $|a_q^R|^2/|a_r^R|^2$ and $|a_q^0|^2/|a_r^0|^2$. During exciting the straddle mounted beam oscillator 15 with the exciting amplitude strength $|a_q^R|^2$ and $|a_r^R|^2$, practical spectrum strength $|F(q, z_0, 0)|^2$ and $|F(r, z_0, 0)|^2$ are observed and a spectrum strength ratio $X_R = |F(q, z_0, R)|^2/|F(r, z_0, R)|^2$ is determined.

(5) Based on the resultant spectrum strength $|F(q, 0, 0)|^2$ and $|F(r, 0, 0)|^2$ and practical spectrum strength ratios $X_0$ and $X_R$, calculations of the formulas (54) and (55) provide the following results:

$$|F(q, 0, R)|^2 = (|a_q^R|^2/|a_q^0|^2)(\omega_r^2 X_R - \omega_q^2 X_0)/X_0(\omega_r^2 - \omega_q^2) \times |F(q, 0, 0)|^2 \quad (65)$$

$$|F(r, 0, R)|^2 = (|a_r^R|^2/|a_r^0|^2)(\omega_r^2 X_R - \omega_q^2 X_0)/X_R(\omega_r^2 - \omega_q^2) \times |F(r, 0, 0)|^2 \quad (57)$$

(6) If an external stress represented by a stress value z is applied to the straddle mounted beam oscillator 15, the straddle mounted beam oscillator 15 is placed under a stress represented by a stress value $z+z_0$. While the straddle mounted beam oscillator 15 is excited with the same exciting amplitude strength $|a_q^R|^2$ and $|a_r^R|^2$ as in the procedure (4), practical spectrum strength $|F(q, z+z_0, R)|^2$ and $F(r, z+z_0, R)|^2$ are observed and standardized with the spectrum strength $|F(q, 0, R)|^2$ and $|F(r, 0, R)|^2$, respectively. On the basis of the standardized power spectra $G(q, z+z_0)$ and $G(r, z+z_0)$, the residual stress value $z+z_0$ is found from the quantitative relations between standardized power spectrum and stress value z shown in FIG. 8. By subtract subtracting the residual value $z_0$ from the stress value $z+z_0$, the stress value z is obtained. In this instance, the values $z+z_0$ may be averaged in the weighted mean method.

Although the above example is given for the case where the amplitude strength ratios $Y_R$ and $Y_0$ are equal to each other, it is more general to define the amplitude strength ratio $Y_R$ is linearly proportional to the amplitude strength ratio $Y_0$, i.e. $Y_R = \alpha Y_0$ ($\alpha$ is a positive integer).

(ii) In the case where the spectrum strength ratios $X_R$ and $X_0$ are equal to each other:

(1) The amplitude strength ratio $Y_0$ is determined based on exciting amplitude strength $|a_q^0|^2$ and $|a_r^0|^2$ which are arbitrarily established, and spectrum strength $|F(q, 0, 0)|^2$ and $|F(r, 0, 0)|^2$ are theoretically determined based on the amplitude strength ratio $Y_0$.

(2) While the straddle mounted beam oscillator 15 is left in a vacuum (resistance factor R=0) , it is excited with the arbitrarily determined exciting amplitude strength $|a_q^0|^2$ and $|a_r^0|^2$. During the excitation, practical spectrum strength $|F(q, z_0, 0)|^2$ and $|F(r, z_0, 0)|^2$ are observed and a spectrum strength ratio $X_0 = |F(q, z_0, 0)|^2/|F(r, z_0, 0)|^2$ is determined.

(3) From the results, the standardized spectrum strength ratios $G(q, z_0) = |F(q, z_0, 0)|^2/|F(q, 0, 0)|^2$ and $G(r, z_0) = |F(r, z_0, 0)|^2/|F(r, 0, 0)|^2$ are calculated, on the basis of which the residual stress value $z_0$ is determined in the same manner applied to the case where the amplitude strength ratios $Y_R$ and $Y_0$ are equal to each other. The weighted mean processing may be introduced in the procedure.

(4) While the straddle mounted beam oscillator 15 is left in the air (resistance factor R≠0), the exciting amplitude strength $|a_q^R|^2$ and $|a_r^R|^2$ are determined such that the spectrum strength ratio $X_R=|F(q, z_0, R)|^2/|F(r, z_0, R)|^2$ is equal to the practical spectrum strength ratio $X_0=|F(q, z_0, 0)|^2/|F(r, z_0, 0)|^2$. Then, the amplitude strength ratio $Y_R=|a_q^R|^2/|a_r^R|^2$ is calculated (5) Based on the arbitrarily exciting amplitude strength $|a_q^R|^2$ and $|a_r^R|^2$ and their amplitude strength ratio $Y_R$, the theoretical spectrum strength $|F(q, 0, 0)|^2$ and $|F(r, 0, 0)|^2$, and the exciting amplitude strength $|a_q^R|^2$ and $|a_r^R|^2$ and their amplitude strength ratio $Y_R$ according to the practical spectrum strength ratios $X_0$ and $X_R$, calculations of the formulas (54) and (55) provide the following results:

$$|F(q, 0, R)|^2=(|a_q^R|^2/|a_q^0|^2)(\omega_r^2 Y_0-\omega_q^2 Y_R)/Y_R(\omega_r^2-\omega_q^2) \times |F(q, 0, 0)|^2 \quad (58)$$

$$|F(r, 0, R)|^2=(|a_r^R|^2/|a_r^0|^2)(\omega_r^2 Y_0-\omega_q^2 Y_R)/Y_0 (\omega_r^2-\omega_q^2) \times |F(r, 0, 0)|^2 \quad (59)$$

(6) If an external stress represented by a stress value z is applied to the straddle mounted beam oscillator 15, the straddle mounted beam oscillator 15 is placed under a stress represented by a stress value $z+z_0$. While the straddle mounted beam oscillator 15 is excited with the same exciting amplitude strength $|a_q^R|^2$ and $|a_r^R|^2$ as in the procedure (4), practical spectrum strength $|F(q, z+z_0, R)|^2$ and $|F(r, z+z_0, R)|^2$ are observed and standardized with the spectrum strength $|F(q, 0, R)|^2$ and $|F(r, 0, R)|^2$, respectively. On the basis of the standardized power spectra $G(q, z+z_0)$ and $G(r, z+z_0)$, the residual stress value $z+z_0$ is found from the quantitative relations between standardized power spectrum and stress value z shown in FIG. 8. By subtract subtracting the residual value $z_0$ from the stress value $z+z_0$, the stress value z is obtained. In this instance, the values $z+z_0$ may be averaged in the weighted mean method.

Although the above example is given for the case where the spectrum strength ratios $X_R$ and $X_0$ are equal to each other, it is more general to define the spectrum strength ratio $X_R$ is linearly proportional to the spectrum strength ratio $X_0$, i.e. $X_R=\beta X_0$ ($\beta$ is a positive integer).

Periodically conducting the procedures (4)–(6) for stress detection error compensation prevents aggravation of reliability in stress detection which possibly occurs due to air leakage in a long use of the stress detection device.

Figure 13:
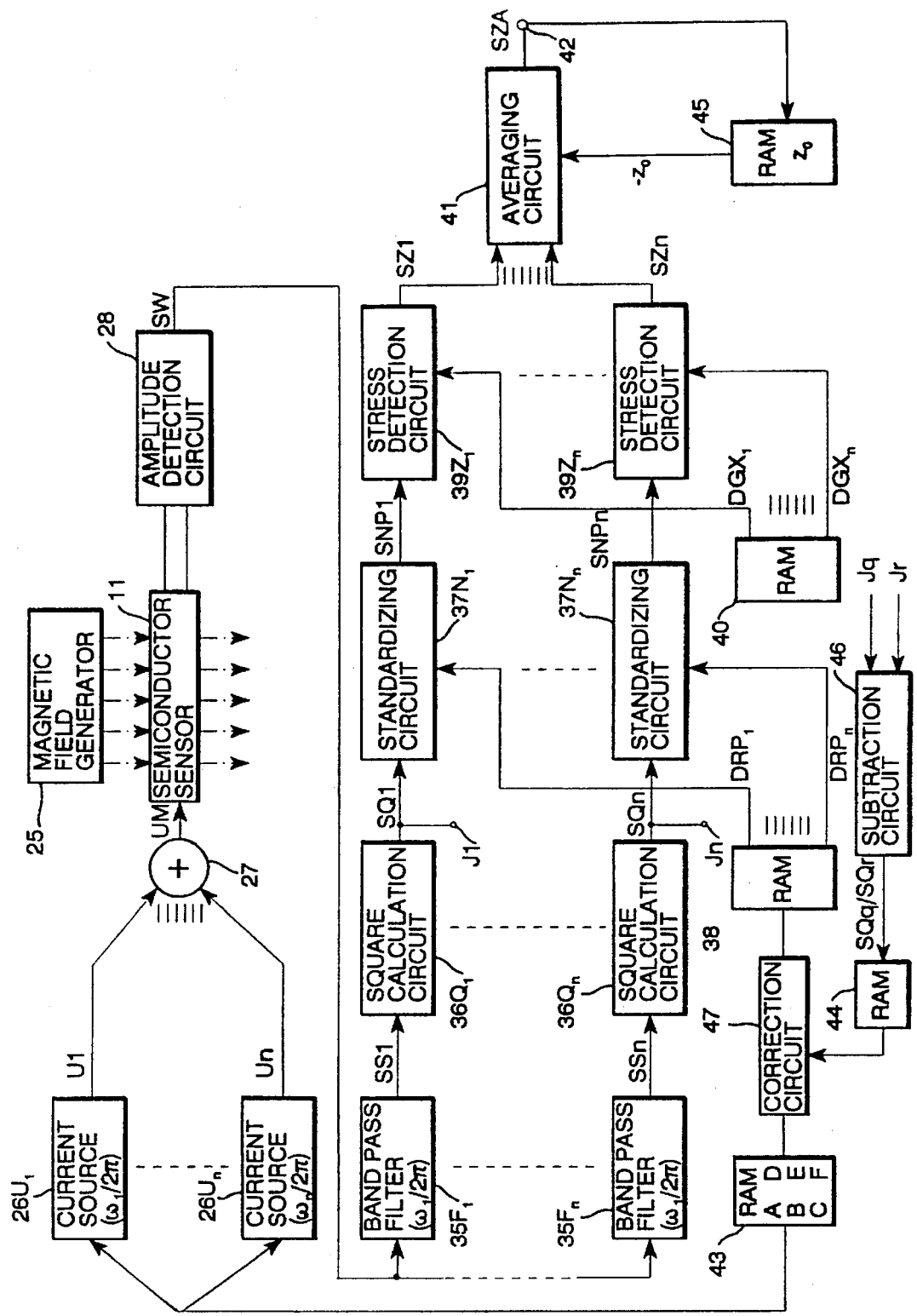
FIG. 13 is a block diagram showing a stress detecting apparatus in accordance with another embodiment of the invention; sensor.

FIG. 13 shows a stress detection device in accordance with another embodiment of the invention in which compensation is made for an error in stress detection. In order for the stress detection device to perform stress detection error compensation, there are added a random access memory (RAM) 44 and subtraction operation circuit 46. The subtraction operation circuit 46 carries out a subtraction calculation on any two power spectra signals among the power spectra represented by the power spectrum signals $SQ_1$ to $SQ_n$ provided by the square processing circuits $36Q_1$ to $36Q_n$ through the output terminals $J_1$ to $J_n$. The result of the subtraction calculation is stored in the random access memory (RAM) 44 and further in the random access memory (RAM) 38.

Once the exciting frequencies $\omega_1/2\pi$ to $\omega_n/2\pi$ have been established, exciting amplitude strength $|a_q^0|^2$ and $|a_r^0|^2$ are established based on any two exciting frequencies $\omega_q/2\pi$ and $\omega_r/2\pi$ voluntarily selected and stored in the internal memory section A of the random access memory (RAM) 43. After having stored the amplitude strength ratio $Y_0(=|a_q^0|^2/|a_r^0|^2)$ in the internal memory section B of the random access memory (RAM) 43, the theoretical spectrum strength $|F(q, 0, 0)|^2$ and $|F(r, 0, 0)|^2$ by solving the formula (13) for the selected frequencies $\omega_q$ and $\omega_r$ and exciting amplitude strength $|a_q^0|^2$ and $|a_r^0|^2$ and stored in both internal memory section C of the random access memory (RAM) 43 and random access memory (RAM) 38. On the other hand, the spectrum strength ratio $X_0$ (=$|F(q, 0, 0)|^2/|F(r, 0, 0)|^2$) is stored in the internal memory section D of the random access memory (RAM) 43.

While holding the semiconductor sensor 11 in a vacuum (resistance factor R=0) so as to isolate the straddle mounted beam oscillator 15 from external actions, an oscillation is caused in the straddle mounted beam oscillator 15 with the exciting frequencies and amplitudes stored in the random access memory (RAM) 43. At this time, a residual stress value $z_0$ represented by the stress value signal SZA and output through the terminal 42 is stored in the random access memory (RAM) 45.

Thereafter, while leaving the semiconductor sensor 11 in a condition (resistance factor R≠0) other than a vacuum, the exciting amplitude strength $|a_q^R|^2$ and $|a_r^R|^2$ are established so that their amplitude strength ratio is equal to the amplitude strength ratio $Y_0$ and stored in both internal memory section E of the random access memory (RAM) 43. Any two power spectra represented by spectrum signals $SQ_q$ to $SQ_r$ provided by the square processing circuits $36Q_1$ to $36Q_n$ are operated in the subtraction operation circuit 46 to provide the spectrum strength ratio $X_R$ of spectrum strength $|F(q, z_0, R)|^2$ and $|F(r, z_0, R)|^2$ which in turn is stored in the random access memory (RAM) 44.

With use of the exciting amplitude strength $|a_q^0|^2$ and $|a_r^0|^2$, the theoretical spectrum strength $|F(q, 0, 0)|^2$ and $|F(r, 0, 0)|^2$ and the spectrum strength ratios $X_0$ and $X_R$ having stored in the A memory section, C memory section and D memory section of the random access memory (RAM) 43, and the random access memory (RAM) 44, respectively, calculations of the formulas (56) and (57) are carried out in the air resistance compensation circuit 47 to determine spectrum strength $|F(q, 0, R)|^2$ and $|F(r, 0, R)|^2$ which are substituted for the theoretical spectrum strength $|F(q, 0, 0)|^2$ and $|F(r, 0, 0)|^2$ in the random access memory (RAM) 38. In this instance, the spectrum strength $|F(q, 0, R)|^2$ (p assumes values other than q and r) which is determined by solving the formula (41) may be stored in the random access memory (RAM) 38.

When exciting the semiconductor sensor 11 with the exciting amplitude which is stored in the memory section E of the random access memory (RAM) 43, the straddle mounted beam oscillator 15 experiences the stress of a value z due to an external action in addition the residual stress of a value $z_0$, a stress value signal SZA representing the compound stress of a value $z+z_0$ is provided at the terminal 42. The stress value z is obtained by feedbacking a stress value $-z_0$ previously stored in the random access memory (RAM) 45 in the averaging processing circuit 41.

In another way of stress detection, after arbitral selection of two exciting frequencies out of the exciting frequencies $\omega_1/2\pi$ to $\omega_n/2\pi$, exciting amplitude strength $|a_q^0|^2$ and $|a_r^0|^2$ are established on the basis of the selected exciting frequencies $\omega_q/2\pi$ and $\omega_r/2\pi$ and stored in the internal memory section A of the random access memory (RAM) 43. Together, after having stored the amplitude strength ratio $Y_0(=|a_q^0|^2/|a_r^0|^2)$ in the internal memory section B of the random access memory (RAM) 43, the theoretical spectrum strength $|F(q, 0, 0)|^2$ and $|F(r, 0, 0)|^2$ by solving the formula (13) for the selected frequencies $\omega_q$ and $\omega_r$ and exciting amplitude strength $|a_q^0|^2$ and $|a_r^0|^2$ and stored in both internal memory section C of the random access memory (RAM) 43 and random access memory (RAM) 38. On the other hand, the theoretically obtained spectrum strength ratio $X_0$ ($=|F(q, 0, 0)|^2/|F(r, 0, 0)|^2$) is stored in the internal memory section D of random access memory (RAM) 43.

While holding the semiconductor sensor 11 in a vacuum (resistance factor R=0) so as to isolate the straddle mounted beam oscillator 15 from external actions, an oscillation is caused in the straddle mounted beam oscillator 15 with the exciting frequencies and amplitudes stored in the random access memory (RAM) 43. At this time, a residual stress value $z_0$ represented by the stress value signal SZA and output through the terminal 42 is stored in the random access memory (RAM) 45.

Thereafter, while leaving the semiconductor sensor 11 in a condition (resistance factor R≠0) other than a vacuum, the exciting amplitude strength $|a_q{}^R|^2$ and $|a_r{}^R|^2$ are established so that their amplitude strength ratio is equal to the amplitude strength ratio $Y_0$ and stored in both internal memory section F of the random access memory (RAM) 43. With use of the exciting amplitude strength $|a_q{}^0|^2$ and $|a_r{}^0|^2$, the theoretical spectrum strength $|F(q, 0, 0)|^2$ and $|F(r, 0, 0)|^2$ and the spectrum strength ratios $X_0$ and $X_R$ having stored in the A memory section, C memory section and B and F memory sections of the random access memory (RAM) 43, respectively, calculations of the formulas (58) and (59) are carried out in the air resistance compensation circuit 47 to determine spectrum strength $|F(q, 0, R)|^2$ and $|F(r, 0, R)|^2$ which are substituted for the theoretical spectrum strength $|F(q, 0, 0)|^2$ and $|F(r, 0, 0)|^2$ in the random access memory (RAM) 38. In this instance, the spectrum strength $|F(q, 0, R)|^2$ (p assumes values other than q and r) which is determined by solving the formula (41) may be stored in the random access memory (RAM) 38.

When exciting the semiconductor sensor 11 with the exciting amplitude which is stored in the memory section F of the random access memory (RAM) 43, the straddle mounted beam oscillator 15 experiences the stress of a value z due to an external action in addition the residual stress of a value $z_0$, a stress value signal SZA representing the compound stress of a value $z+z_0$ is provided at the terminal 42. The stress value z is obtained by adding the stress value $-z_0$ previously stored in the random access memory (RAM) 45 in the averaging processing circuit 41.

In the previous embodiments, in order to make compensation for changes due to residual stress and/or air resistance, amplitude spectrum strength of different frequencies are used. During frequency analysis with respect to the amplitude spectrum strength, band-pass filters must have a narrow distribution of transmission factors for preventing power spectra of frequencies different from an intended frequency being mixed in. Fabrication of such a band-pass filter often accompanies technological difficulties. Further, as shown in FIG. 8, the standardized spectrum strength shows a divergent increase according to the values of $y_p$ and z in some cases. This is because that as reaching a resonant condition defined by the values of $y_p$ and z, the straddle mounted beam oscillator 15 encounters an oscillation of which the amplitude shows a divergent increase. Practically, the straddle mounted beam oscillator 15 generates an oscillation with an increased amplitude but does not show a divergence in amplitude. Consequently, if trying to determine the stress value z from a divergent part of the spectrum strength curve G(p, z, R), the detected stress value contains a large error.

In view of the above discussion, in the stress detection according to the invention, the exciting frequencies may be established such that the frequency difference is sufficiently large with respect to the distribution of transmission factors.

Further, the available region of spectrum strength curve G(p, z, R) may be restricted to values equal to or less than 1.

Figure 14:
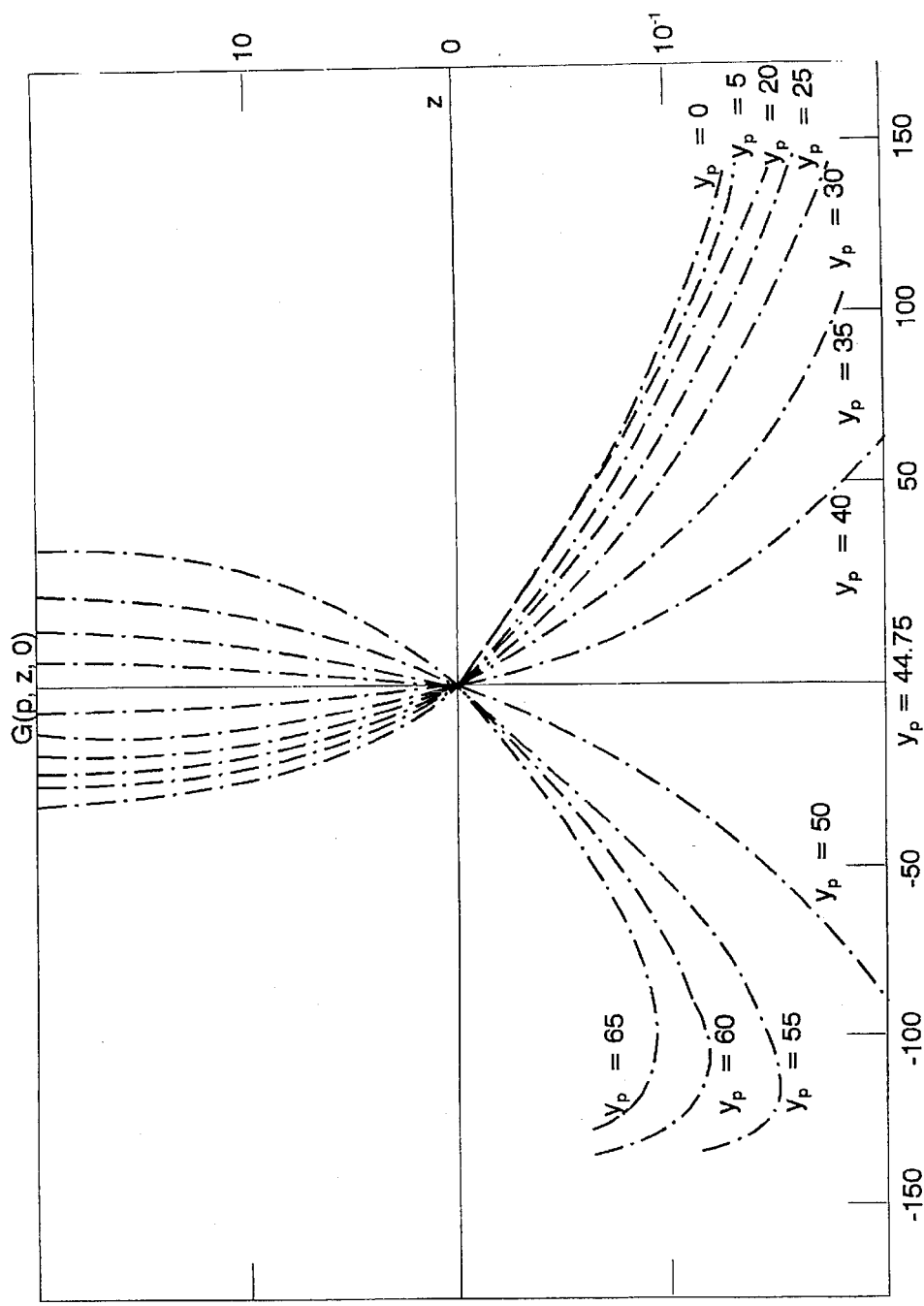
FIG. 14 is a diagram showing a quantitative relation between standardized power spectrum and stress value.

Specifically, as shown in FIG. 14, in the quantitative relation between standardized power spectrum G(p, z, 0) and stress value z, the standardized power spectrum G(p, z, 0) is given by an increasing function for parameters $y_p$ greater than 44.75 and by a decreasing function for parameters $y_p$ less than 44.75. The parameter $y_p$ of 44.75 is nothing else but the value of the factor (sin $h\sqrt{y_{k/8}}$ cos$\sqrt{y_{k/8}}$ + sin$\sqrt{y_{k/8}}$ cos h $\sqrt{y_{k/8}}$) in the formula (17) is 0 (zero). When considering the case where the standardized power spectrum G(p, z, 0) is equal to or less than 1, two exciting frequencies are established so as to satisfy the following conditions:

$$\left. \begin{array}{l} \omega_q > 44.75 \sqrt{EI/4\rho_0 AL^4} \\ \omega_r < 44.75 \sqrt{EI/4\rho_0 AL^4} \end{array} \right\} \quad (60)$$

The exciting frequency $\omega_q$ thus established conditions G(p, z, 0)≦1 for z≦0. Similarly, the exciting frequency $\omega_r$ thus established conditions G(p, z, 0)≧1. for z≧0. This enables the detection of stress value z on condition of G(p, z, 0)≦1. That is, the stress value z may be found from the characteristic curve (FIG. 14) for a standardized power spectrum G(p, z, 0)≦1. In this manner, the foregoing of divergent increase in amplitude is eliminated.

In this instance, the frequencies $\omega_q$ and $-\omega_r$ are established to be sufficiently larger than the decentralization of transmission factor of the band-pass filter. As a result, the band-pass filter does not mix standardized power spectra G(p, z, 0) of frequencies of $\omega_q$ and $\omega_r$.

While the region of standardized power spectra G(q, z, 0) less than 1 (one) is advantageous from a viewpoint of stress detection error, because amplitudes of oscillations existing in that region are relatively small, the stress detection must be performed with an increased accuracy. For this reason, one of the frequencies $\omega_q/2\pi$ and $\omega_r/2\pi$, for instance the frequency $\omega_q/2\pi$ is established to a value relatively close to the resonant frequency, and another frequency $\omega_r/2\pi$ to a value sufficiently far from the resonant frequency. This results in an increase in amplitudes of the whole oscillations and, however, a small amplitude of a component oscillation of the frequency $\omega_q/2\pi$. When the standardized power spectra G(q, z, 0) is less than 1, the standardized power spectra G(r, z, 0) is greater than 1. That is, when detecting a stress through the spectrum of the frequency $\omega_q$, the frequency $\omega_r$ causes an oscillation with a large amplitude similar to the resonant oscillation in the straddle mounted beam oscillator 15. On the other hand, when the standardized power spectra G(r, z, 0) is less than one (1), the frequency $\omega_q$ causes an oscillation with a large amplitude similar to the resonant oscillation in the straddle mounted beam oscillator 15 in the region of standardized power spectra G(q, z, 0) greater than 1.

Specifically, when establishing the exciting frequencies $\omega_q/2\pi$ and $\omega_r/2\pi$ so as to satisfy the conditions (60), the stress value is determined based on the standardized spectrum strength for one of exciting frequencies $\omega_q/2\pi$ and $\omega_r/2\pi$ which is kept sufficiently far from the resonant frequency in spite of positive stress or negative stress.

Figure 15:
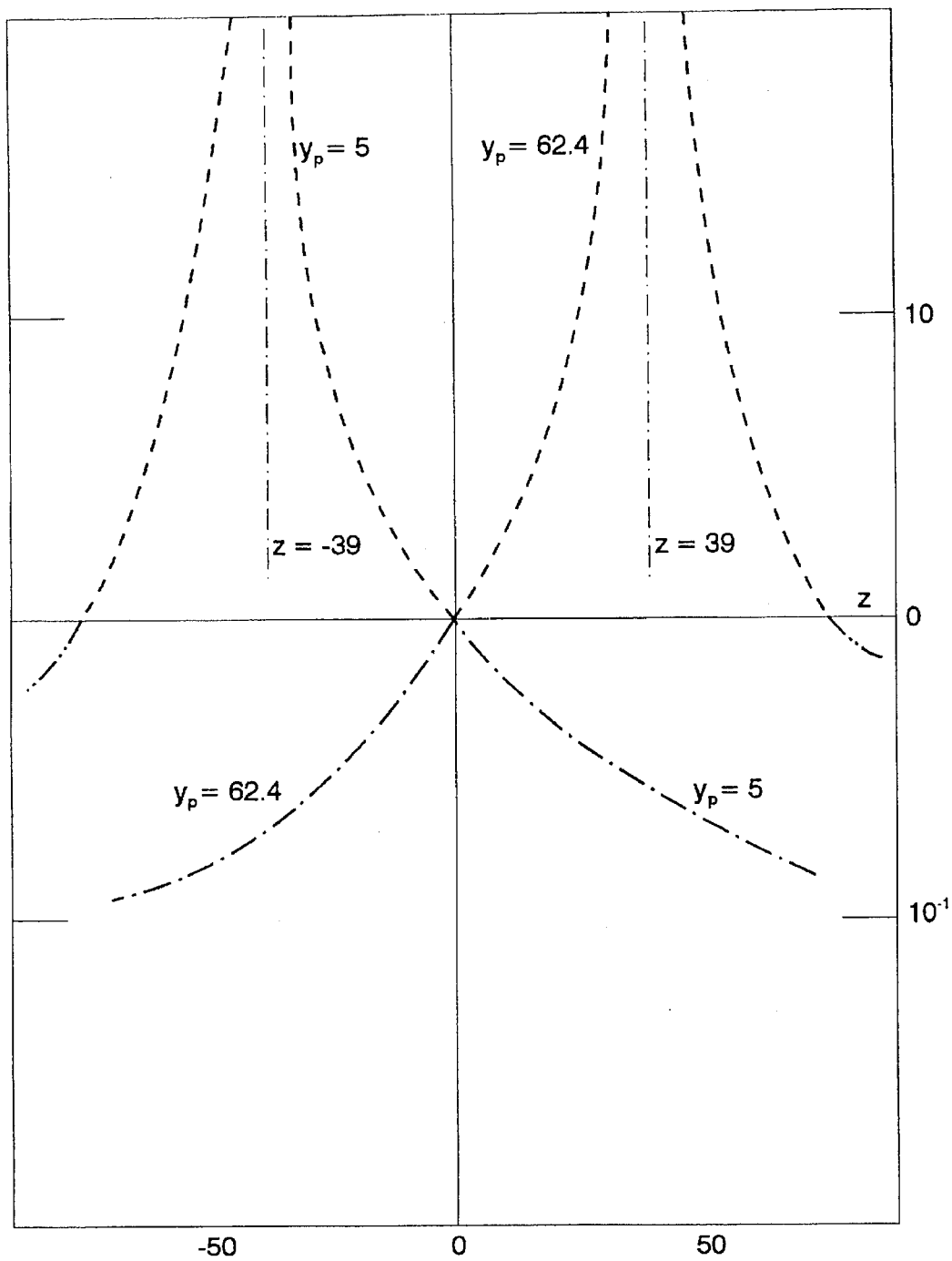
FIG. 15 is a diagram showing a quantitative relation between standardized power spectrum and stress value for specific parameters.
Figure 16:
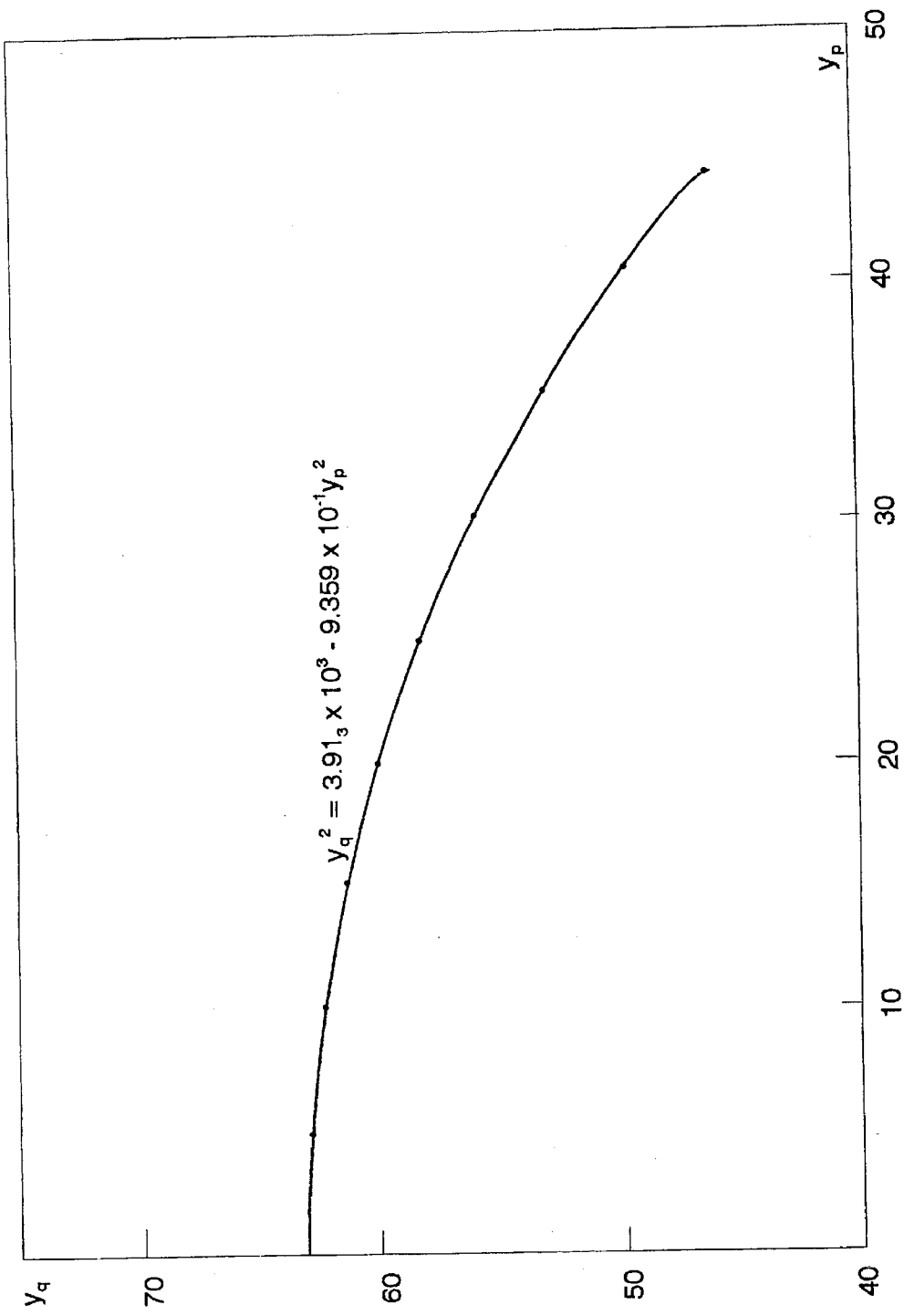
FIG. 16 is a diagram showing a quantitative relation between parameters $y_q$ and $y_r$ available in combination.

Because the exciting frequencies $\omega_q/2\pi$ and $\omega_r/2\pi$ which are established through casual selection without any limit to the difference therebetween, and because it is troublesome to derive a quantitative relation for particular stress value z when determining stress value z from a quantitative relation between standardized power spectrum and stress which is obtained on the basis of theoretical values, it is preferred to establish the exciting frequencies $\omega_q$ and $\omega_r$ so as to provide a symmetry of standardized power spectra G(q, z, 0) and G(r, z, 0) with respect to stress values z. The symmetry of standardized power spectra G (q, z, 0) and G(r, z, 0) is achieved by appropriately selecting $\omega_p$ for the characteristic curves of standardized power spectrum G(p, z, 0) shown in FIG. 14. For example, as shown in FIG. 15, a symmetry of standardized power spectra G(q, z, 0) and G(r, z, 0) is provided when selecting the exciting frequencies $\omega_q$ and $\omega_r$ given by the following formulas (61):

$$\omega_q = 5\sqrt{EI/4\rho_0 AL^4} \; \omega \quad \Big\} \quad (61)$$
$$_q = 62.4\sqrt{EI/4\rho_0 AL^4} \quad \Big\}$$

The symmetry is provided for various combinations of parameters $y_p$. The available combinations of parameters $y_p$ is formulated for the parameters $yq_p > 44.75$ and $y_r < 44.75$ as follows:

$$y_q^2 = 3.913 \times 10^3 - 9.353 \times 10^{-1} y_r^2 \quad (62)$$

As long as band-path filters have distributions of transmission factors, it is generally impossible to perfectly separate amplitude spectra by exciting frequencies $\omega_q$ and $\omega_r$ in order to detect the strength of the separated amplitude spectra. However, when the difference between the exciting frequencies $\omega_q$ and $\omega_r$ is sufficiently large, the amplitude spectra are almost perfectly separated by the exciting frequencies $\omega_q$ and $\omega_r$. Specifically, when the exciting frequencies $\omega_q$ and $\omega_r$ are given by a quantitative relation of $\omega_q = n\omega_r$ (where n is sufficiently larger than 1). In other words, the parameters $y_q^2$ and $y_r^2$ are formulated with reference to the formula (62) as follows:

$$y_r^2 = (3.913 \times 10^3)/(n^2 + 9.395 \times 10^{-1}) \quad \Big\} \quad (63)$$
$$y_q^2 = (3.913 \times 10^3 n^2)/(n^2 + 9.395 \times 10^{-1}) \quad \Big\}$$

For example, the parameters $y_r^2$ and $y_q^2$ are 6.2 and 62.3, respectively, for the constant n=10. With an increase in the constant n, the parameters $y_r^2$ and $y_q^2$ become closely to 0 and 62.6. This means that the exciting force comprises a direct wave component and a sine wave component. The formulas (63) are rewritten as follows:

$$\omega_r = \{62.6n/\sqrt{(n^2 + 9.395 \times 10^{-1})} \; \} \times \sqrt{EI/4\rho_0 AL^4} \quad (64)$$

$$\omega_r = \{62.6n/\sqrt{(n^2 + 9.395 \times 10^{-1})} \; \} \times \sqrt{EI/4\rho_0 AL^4}$$

By means of the exciting frequencies $\omega_q$ and $\omega_r$ as given by the formula (64), the amplitude spectra are given a symmetry and almost perfectly separated.

In practical stress detection in the stress detecting method according to the first embodiment of the invention in which the straddle mounted beam oscillator 15 has a residual stress $z_0$, standardized power spectra G(q, z, 0) and G(r, z, 0) are detected while the straddle mounted beam oscillator 15 is excited on a condition free from any external action. If the standardized power spectrum G(r, z, 0) is equal to or less than one (1), the stress value z is read from the characteristic curve and given a minus sign as a negative value which indicates a compression residual stress. On the other hand, if the standardized power spectrum G(q, z, 0) is equal to or less than 1, the stress value z is read from the characteristic curve as a positive value which indicates a tensile residual stress.

Thereafter, standardized power spectra G(q, z, 0) and G(r, z, 0) are detected while the straddle mounted beam oscillator 15 is excited under an external condition. If the standardized power spectrum G(r, z, 0) is equal to or less than 1, the stress value z is read from the characteristic curve and given a minus sign as a negative value which indicates a loaded compression stress generated in the straddle mounted beam oscillator 15. A true stress is obtained by subtracting the compression residual stress from the loaded compression stress. Similarly, if the standardized power spectrum G(q, z, 0) is equal to or less than 1, the stress value z is read from the characteristic curve as a positive value which indicates a loaded tensile stress. A true stress is obtained by subtracting the tensile residual stress from the loaded tensile stress.

In practical stress detection in the stress detecting method according to the second embodiment of the invention in which the straddle mounted beam oscillator 15 is put in a vacuum (resistance factor R=0) so as to be free from air resistance, because the degree of vacuum gradually decreases due to leakage, the spectrum strength for a frequency $\omega_p$ is given by the following formula (65) with reference to the formula (41):

$$|F(P,z,R)|^2 = M^2 |a_p|^2/(\rho A)\{^2\omega_p^4 + R^2\omega_p^2)\} \times \quad (65)$$
$$[\{\upsilon_p \sinh\upsilon_p(1 - \cos\lambda_p) + \lambda_p \sin\lambda_p(1 - \cosh\upsilon_p)\} \div$$
$$\{(\upsilon_p \sinh\upsilon_p \cdot \cos\lambda_p + \upsilon_p \sin\lambda_p \cdot \lambda\cosh\upsilon_p)\}]^2$$

Figure 17:
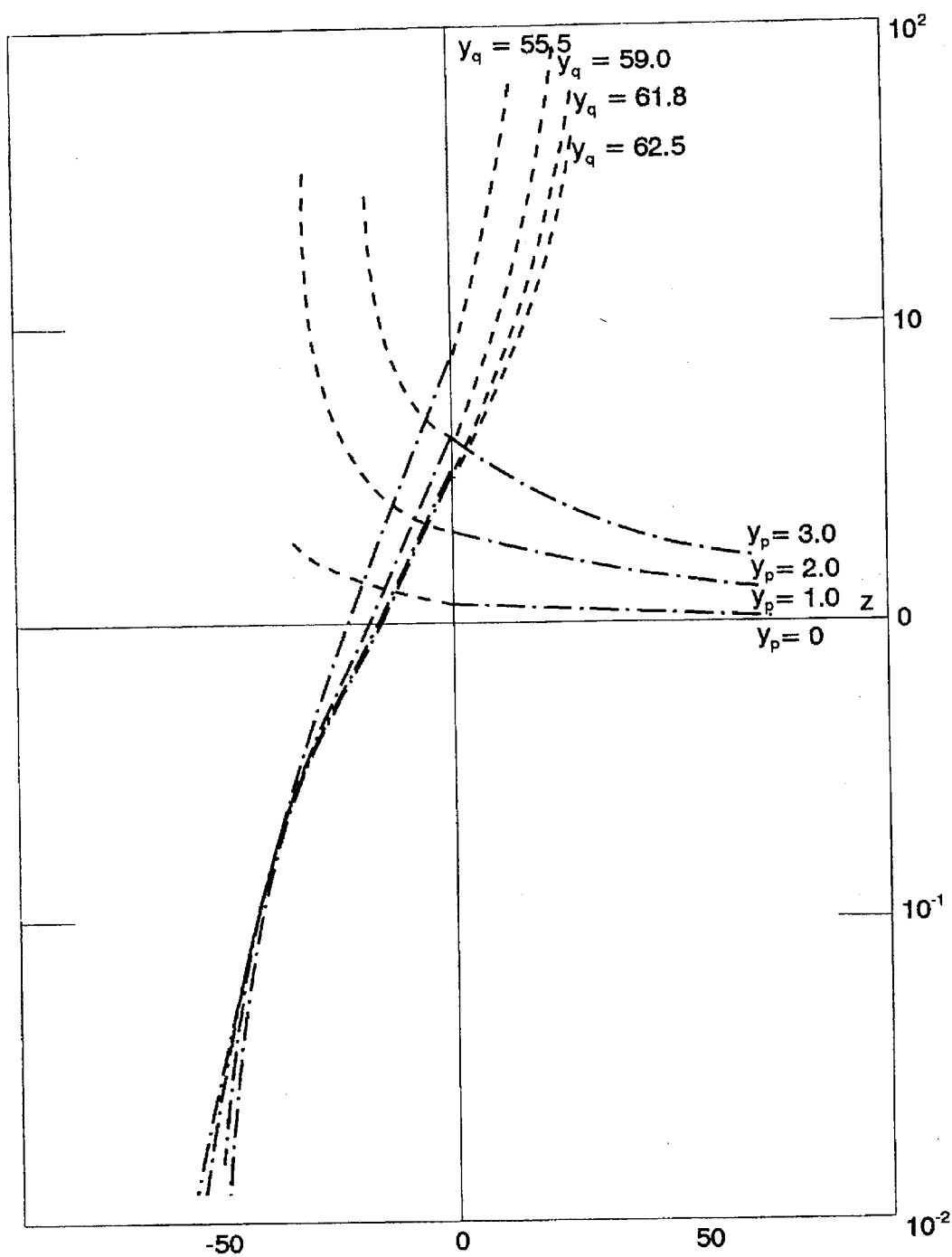
FIG. 17 is a diagram showing a quantitative relation between standardized power spectrum and stress value for specific parameters.

This formula (65) is available under satisfaction of the condition (40) necessary to provide the approximate solution (39) of the formula (38). For this requirement, as shown in FIG. 17, quantitative relations given by the right side of the condition (40) are provided for parameters $y_r$ and $y_q$ which achieve the symmetry of spectrum strength curves G(p, z, R). It is apparent from FIG. 17 that the right side of the condition (40) assumes a value less than 1 in spite of negative or positive stress values z. In this instance, the resistance factor R is given by the formula (44).

The straddle mounted beam oscillator 15 made of a silicon wafer has specified physical dimensions, a length L of approximately 500 µm, a width b of approximately 20 µm and a thickness h of 3 µm, has a density $\rho_0$ of $2.3 \times 10^{-3}$ kg/m$^3$, the Young's modulus of $1.7 \times 10^{11}$ kg/s$^2$·m, and a second moment of area I of bh3/12=$4.50 \times 10^{-23}$ m$^4$. The $\rho_0 A$· $\omega_p$ are given as follows:

$$\rho_0 A = 1.38 \times 10^{-7} \text{ kg/m} \quad (66)$$

$$\omega_p = y_p \sqrt{EI/4\rho_0 AL^4} = 1.49 \times 10^4 y_p (1/s)$$

The following formula is obtained for the left side of the condition (40):

$$1+(\rho_0 A/R)^2 = 1+1.18 \times 10^4 y_p (1/s) \quad (67)$$

Resultingly, while the condition (40) is held if the parameter is 0, the left side of the condition (40) has a value one order in magnitude larger than the right side. For example, considering a combination of parameters $y_r=10$ and $y_q=61.8$, the right side of the condition (40) becomes three orders in magnitude larger than the right side, there is no problem of using the approximate solution given the formula (38).

In the study of the term $\rho_0 A \omega_p^2 - R_1 \omega p_2$ included in the approximate solution given by the formula (38), when estimating the value of the following formula (68), $$|\rho_0 A\omega_p{}^2 - R_1\omega_p| = \rho_0 A\omega_p{}^2 \times \sqrt{1 + R^2/(\rho_0 A\omega_p)^2} \quad (68)$$

the following formula is given:

$$(R^2/\rho_0 A\omega_p)^2 = 8.45 \times 10^{-3}/y_p{}^2 \quad (69)$$

Since the value of $\rho_0 A\omega_p$ becomes nearly equal to the resistance factor R for the parameter $y_p$ of $9.19\times10^{-2}$, the term $R_1\omega_p$ is not negligible. However, the term $R_1\omega_p$ is not negligible is negligible when the value of $\rho_0 A\omega_p$ is sufficiently larger than the resistance factor R for the parameter $y_p$ greater than 1.

From the result of the above study, in the method in which exciting frequencies $\omega_q$ and $\omega_r$ are selected so as to provide the symmetry of standardized power spectra G(p, z, 0) with respect to specified stress values z and the stress value is determined within the region where the standardized power spectra G(p, z, 0) are equal to or less than 1, air resistance can be ignored for parameters $y_r$ other than almost 0.

As described above, when the spectrum for, for instance, a frequency $\omega_q/2\pi$ is less than 1, the spectrum for another frequency $\omega_r/2\pi$ becomes greater than 1, eliminating an occurrence of detection error due to an divergent increase in amplitude. Furthermore, while the amplitude of a component oscillation with a frequency of $\omega_q/2\pi$ becomes smaller, the amplitude of a component oscillation with a frequency of $\omega_r/2\pi$ is large, aggravation of sensitivity in amplitude detection is prevented in, in particular, an electrostatic capacity detection method.

By means of providing standardized spectrum strength symmetrical with respect to standardized stress value like an even function, the quantitative relation between standardized spectrum strength and stress value is abridged, and the stress detecting apparatus can be made simple consequently.

The frequencies $\omega_q$ and $\omega_r$ established to be relatively far different from each other are almost perfectly separated without the effect of crosstalk in the spectra.

While, the degree of vacuum of a container in which the stress detecting apparatus is placed is one of serious constraints, the selection of the frequencies $\omega_q$ and $\omega_r$ satisfying the given condition allows to ignore the effect of air resistance even in the air and makes compensation of errors due to air resistance unnecessary.

If the straddle mounted beam oscillator is held in a vacuum, the stress detecting apparatus is allowed to be configured more simply, which makes the following condition (70) available.

$$\left.\begin{array}{l}\omega_r = 0 \\ \omega_r = 62.6\sqrt{EI/4\rho_0 AL^4}\end{array}\right\} \quad (70)$$

This condition corresponds to a state where the constant n is infinity and is the most advantageous one for spectrum separation.

With reference to the formulas (70), the standardized spectrum G (z) can be expressed as follows:

$$G(z) = \lim_{y_r \to 0} G(p,z) = 48^2\{1/z - 4\tanh(\sqrt{z}/4)/z^{3/2}\}(z \geq 0)$$

$$G(z) = 48^2\{1/z - 4\tanh(\sqrt{-z}/4)/-z^{3/2}\}(z \leq 0)$$

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A method of detecting a stress by means of the utilization of a semiconductor equipped with a straddle mounted beam oscillator, said stress detecting method comprising the steps of:

driving the semiconductor sensor so as to generate a compound oscillation which comprises a plurality of component oscillations having different component frequencies, respectively;

detecting separately component amplitudes of said compound oscillation for said respective component frequencies;

calculating squares of said component amplitudes to provide power spectra of said component amplitudes;

standardizing said power spectra, respectively, with reference power spectra, each of which is a theoretical power spectrum for an amplitude of an oscillation having each said component oscillation frequency of said straddle mounted beam oscillator which is free from any stress;

determining stress values for said standardized power spectra from relations between power spectrum and stress value previously provided for said component amplitudes, respectively; and obtaining a means stress value by averaging said stress values and determining a stress generated in said straddle mounted beam oscillator based on said mean stress value.

2. A stress detecting method as defined in claim 1, wherein a smallest component oscillation frequency among said different component oscillation frequencies of said compound oscillation is established greater than a resonant oscillation frequency of said straddle mounted beam oscillator on which a stress value representing a stress generated in said straddle mounted beam oscillator assumes an upper limit.

3. A stress detecting method as defined in claim 1, wherein each said component amplitude is detected as a frequency of change in electrostatic capacity generated between an electrode fixed to said straddle mounted beam oscillator and a stationary electrode fixed to said semiconductor sensor for each said component frequencies, said frequency of change in electrostatic capacity being squared to provide said power spectrum.

4. A stress detecting method as defined in claim 3, wherein said means stress value is obtained by averaging said stress values with weighing factors determined based on said standardized power spectra.

5. A stress detecting method as defined in claim 1, wherein said different component frequencies includes at least two component oscillations having oscillation frequencies $\omega_q$ and $\omega_r$ expressed respectively as follows:

$$\omega_q > 44.75\sqrt{EI/4\rho_0 AL^4}$$

$$\omega_r < 44.75\sqrt{EI/4\rho_0 AL^4}.$$

6. A method of detecting a stress generated in a straddle mounted beam oscillator of a semiconductor sensor, which comprising the steps of:

driving the semiconductor sensor so as to generate a compound oscillation including a plurality of component oscillations which have different frequencies;

detecting separately component amplitudes of said compound oscillation for said respective frequencies;

calculating squares of said component amplitudes to provide power spectra of said component amplitudes;

standardizing said power spectra, respectively, with reference power spectra for amplitudes of oscillations having said frequencies of said straddle mounted beam oscillator which is placed in a vacuum;

determining stress values for said standardized power spectra from relations between power spectrum and stress value previously provided for said component amplitudes, respectively; and obtaining a means stress value by averaging said stress values and determining a stress generated in said straddle mounted beam oscillator based on said mean stress value.

7. A stress detecting method as defined in claim 6, wherein each said reference power spectrum is a theoretical power spectrum for an amplitude of an oscillation having said component oscillation frequency of said straddle mounted beam oscillator which is free from any stress in a vacuum.

8. A stress detecting method as defined in claim 6, wherein a smallest component oscillation frequency among said different component oscillation frequencies of said compound oscillation is established greater than a resonant oscillation frequency of said straddle mounted beam oscillator on which a stress value representing a stress generated in said straddle mounted beam oscillator assumes an upper limit.

9. A stress detecting method as defined in claim 6, wherein each said component amplitude is detected as a frequency of change in electrostatic capacity generated between an electrode fixed to said straddle mounted beam oscillator and a stationary electrode fixed to said semiconductor sensor for each said component frequencies, said frequency of change in electrostatic capacity being squared to provide said power spectrum.

10. A stress detecting method as defined in claim 9, wherein said means stress value is obtained by averaging said stress values with weighing factors determined based on said standardized power spectra.

11. A stress detecting method as defined in claim 6, wherein said different component frequencies includes at least two component oscillations having oscillation frequencies $\omega_q$ and $\omega_r$ expressed respectively as follows:

$$\omega_q > 44.75 \sqrt{EI/4\rho_0 AL^4}$$

$$\omega_r < 44.75 \sqrt{EI/4\rho_0 AL^4} .$$

12. A stress detecting apparatus comprising:

a semiconductor sensor having a straddle mounted beam oscillator as stress generating means;

driving means for driving said semiconductor sensor such that said straddle mounted beam oscillator causes a compound oscillation including a plurality of component oscillations having different oscillation frequencies, respectively;

amplitude detecting means for detecting an amplitude of said compound oscillation;

oscillation spectrum detecting means for detecting separately component amplitudes of said compound oscillation for different oscillation frequencies;

square operating means for calculating a square of each said component amplitudes to provide a power spectrum;

standardizing means for standardizing said power spectra, respectively, with reference power spectra, each of which is a theoretical power spectrum for an amplitude of an oscillation having each said component oscillation frequency of said straddle mounted beam oscillator which is free from any stress;

stress value determining means for determining stress values for said standardized power spectra from relations between power spectrum and stress value previously provided for said component amplitudes, respectively; and means stress value determining means for determining a mean stress value of said stress values and determining a stress generated in said straddle mounted beam oscillator based on said mean stress value.

13. A stress detecting apparatus as defined in claim 12, wherein a smallest component oscillation frequency among said different component oscillation frequencies of said compound oscillation is established greater than a resonant oscillation frequency of said straddle mounted beam oscillator on which a stress value representing a stress generated in said straddle mounted beam oscillator assumes an upper limit.

14. A stress detecting apparatus as defined in claim 12, wherein each said component amplitude is detected as a frequency of change in electrostatic capacity generated between an electrode fixed to said straddle mounted beam oscillator and a stationary electrode fixed to said semiconductor sensor for each said component frequencies, said frequency of change in electrostatic capacity being squared to provide said power spectrum.

15. A stress detecting apparatus as defined in claim 14, wherein said means stress value is obtained by averaging said stress values with weighing factors determined based on said standardized power spectra.

16. A stress detecting apparatus as defined in claim 12, wherein said different component frequencies includes at least two component oscillations having oscillation frequencies $\omega_q$ and $\omega_r$ expressed respectively as follows:

$$\omega_q > 44.75 \sqrt{EI/4\rho_0 AL^4}$$

$$\omega_r < 44.75 \sqrt{EI/4\rho_0 AL^4} .$$

17. A stress detecting apparatus comprising:

a semiconductor sensor having a straddle mounted beam oscillator as stress generating means;

driving means for driving said semiconductor sensor such that said straddle mounted beam oscillator causes a compound oscillation including a plurality of component oscillations having different oscillation frequencies, respectively;

amplitude detecting means for detecting an amplitude of said compound oscillation;

oscillation spectrum detecting means for detecting separately component amplitudes of said compound oscillation for different oscillation frequencies;

square operating means for calculating a square of each said component amplitudes to provide a power spectrum;

standardizing means for standardizing said power spectra, respectively, with reference power spectra, each of which is a power spectrum for an amplitude of an oscillation having each said component oscillation frequency of said straddle mounted beam oscillator which is placed in a vacuum;

stress value determining means for determining stress values for said standardized power spectra from relations between power spectrum and stress value previously provided for said component amplitudes, respectively; and means stress value determining means for determining a mean stress value of said stress values and determining a stress generated in said straddle mounted beam oscillator based on said mean stress value.

18. A stress detecting apparatus as defined in claim 17, wherein a smallest component oscillation frequency among said different component oscillation frequencies of said compound oscillation is established greater than a resonant oscillation frequency of said straddle mounted beam oscillator on which a stress value representing a stress generated in said straddle mounted beam oscillator assumes an upper limit.

19. A stress detecting apparatus as defined in claim 17, wherein each said component amplitude is detected as a frequency of change in electrostatic capacity generated between an electrode fixed to said straddle mounted beam oscillator and a stationary electrode fixed to said semiconductor sensor for each said component frequencies, said frequency of change in electrostatic capacity being squared to provide said power spectrum.

20. A stress detecting apparatus as defined in claim 17, wherein said different component frequencies includes at least two component oscillations having oscillation frequencies $\omega_q$ and $\omega_r$ expressed respectively as follows:

$$\omega_q > 44.75 \sqrt{EI/4\rho_0 AL^4}$$

$$\omega_r < 44.75 \sqrt{EI/4\rho_0 AL^4} \ .$$

* * * * *